United States Patent
Lee et al.

(10) Patent No.: US 10,135,086 B2
(45) Date of Patent: Nov. 20, 2018

(54) REDOX FLOW BATTERY

(71) Applicants: Samsung Electronics Co., Ltd., Suwon-si, Gyeonggi-do (KR); KOREA ELECTRONICS TECHNOLOGY INSTITUTE, Seongnam-si, Gyeonggi-do (KR)

(72) Inventors: Dooyeon Lee, Yongin-si (KR); Kijae Kim, Seongnam-si (KR); Dukjin Oh, Seoul (KR); Jiyoung Jeong, Hwaseong-si (KR)

(73) Assignees: SAMSUNG ELECTRONICS CO., LTD., Gyeonggi-do (KR); KOREA ELECTRONICS TECHNOLOGY INSTITUTE, Gyeonggi-do (KR)

( * ) Notice: Subject to any disclaimer, the term of this patent is extended or adjusted under 35 U.S.C. 154(b) by 19 days.

(21) Appl. No.: 14/548,465

(22) Filed: Nov. 20, 2014

(65) Prior Publication Data
US 2015/0147620 A1 May 28, 2015

(30) Foreign Application Priority Data
Nov. 22, 2013 (KR) .................. 10-2013-0143246

(51) Int. Cl.
*H01M 8/18* (2006.01)
*H01M 8/0206* (2016.01)

(52) U.S. Cl.
CPC .......... *H01M 8/188* (2013.01); *H01M 8/0206* (2013.01); *H01M 2300/0082* (2013.01); *Y02E 60/528* (2013.01)

(58) Field of Classification Search
CPC .............. H01M 8/188; H01M 8/0206; H01M 2300/0082
(Continued)

(56) References Cited

U.S. PATENT DOCUMENTS 3,623,913 A * 11/1971 Adlhart .............. H01M 8/2415
429/434
5,445,905 A * 8/1995 Marsh .................. H01M 12/04
429/101
(Continued)

FOREIGN PATENT DOCUMENTS

CN 102468490 A * 5/2012 ............. H01M 4/86
JP 2010-086935 A 4/2010
(Continued)

*Primary Examiner* — Miriam Stagg
*Assistant Examiner* — Victoria H Lynch
(74) *Attorney, Agent, or Firm* — Cantor Colburn LLP

(57) ABSTRACT

A redox flow battery including: a cathode cell including a cathode, a catholyte, and a bipolar plate; an anode cell including an anode, an anolyte, and a bipolar plate; and an ion exchange membrane interposed between the cathode cell and the anode cell, wherein at least one of the cathode and the anode comprises a carbon-coated metal foam, wherein the ion exchange membrane includes a porous substrate and a polymer disposed in pores of the porous substrate, wherein the polymer is a polymerization product of a composition for preparing an ion exchange membrane, and wherein the composition for preparing an ion exchange membrane includes a first aromatic vinyl monomer including a halogenated alkyl group or a quaternary ammonium group, and wherein the bipolar plate includes Ni, Cu, Fe, Cr, Al, W, Ti, or a mixture thereof, or an alloy thereof.

20 Claims, 21 Drawing Sheets

(58) Field of Classification Search
USPC .......................................................... 429/105
See application file for complete search history.

(56) References Cited

U.S. PATENT DOCUMENTS

| | | | |
|---|---|---|---|
| 6,764,789 B1 | 7/2004 | Sekiguchi et al. | |
| 6,905,797 B2* | 6/2005 | Broman | H01M 4/8615 |
| | | | 29/623.1 |
| 7,309,540 B2* | 12/2007 | Wang | B82Y 30/00 |
| | | | 422/199 |
| 7,927,731 B2 | 4/2011 | Sahu | |
| 8,399,152 B2 | 3/2013 | Yoshizawa et al. | |
| 2005/0011826 A1* | 1/2005 | Childs | B01D 67/0006 |
| | | | 210/490 |
| 2005/0040090 A1* | 2/2005 | Wang | B01D 69/141 |
| | | | 210/184 |
| 2009/0220840 A1 | 9/2009 | Yamaguchi et al. | |
| 2011/0290714 A1* | 12/2011 | Inoue | C08F 2/32 |
| | | | 210/496 |
| 2012/0115069 A1 | 5/2012 | Noack et al. | |
| 2012/0301767 A1* | 11/2012 | Kim | B82Y 30/00 |
| | | | 429/105 |
| 2013/0189592 A1* | 7/2013 | Roumi | H01G 9/048 |
| | | | 429/406 |
| 2013/0230793 A1* | 9/2013 | Wang | C25B 11/0478 |
| | | | 429/509 |
| 2013/0252041 A1* | 9/2013 | Fujimoto | H01M 10/36 |
| | | | 429/70 |
| 2014/0066528 A1* | 3/2014 | Yoshimura | B01D 69/02 |
| | | | 521/27 |

FOREIGN PATENT DOCUMENTS

| | | |
|---|---|---|
| KR | 1020110088881 A | 8/2011 |
| KR | 10-1163996 B1 | 7/2012 |
| KR | 1020130132107 A | 12/2013 |

* cited by examiner

FIG. 3E
FIG. 3F
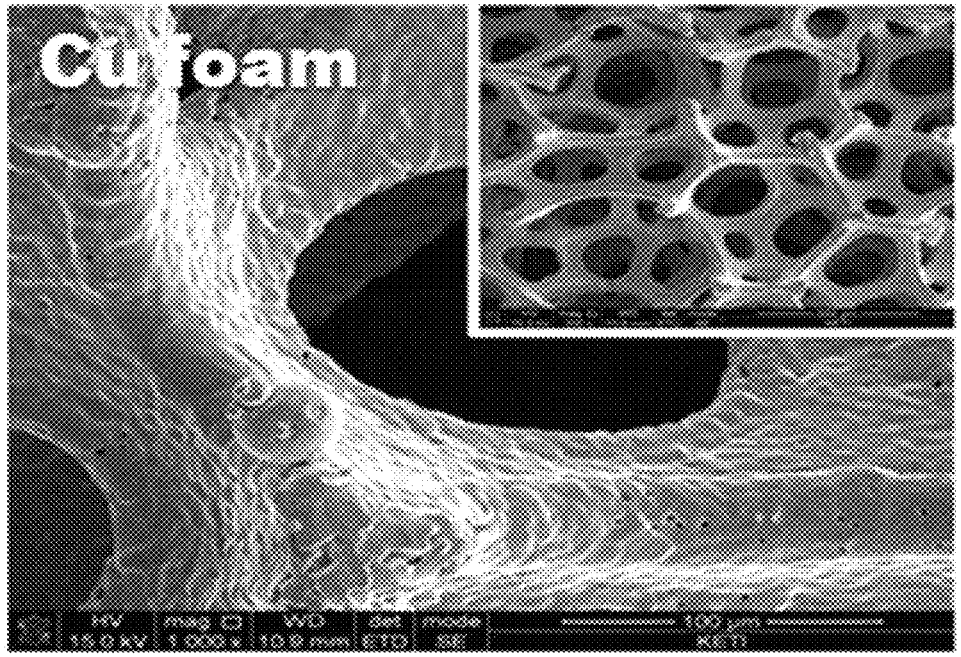
FIG. 3G
FIG. 3H
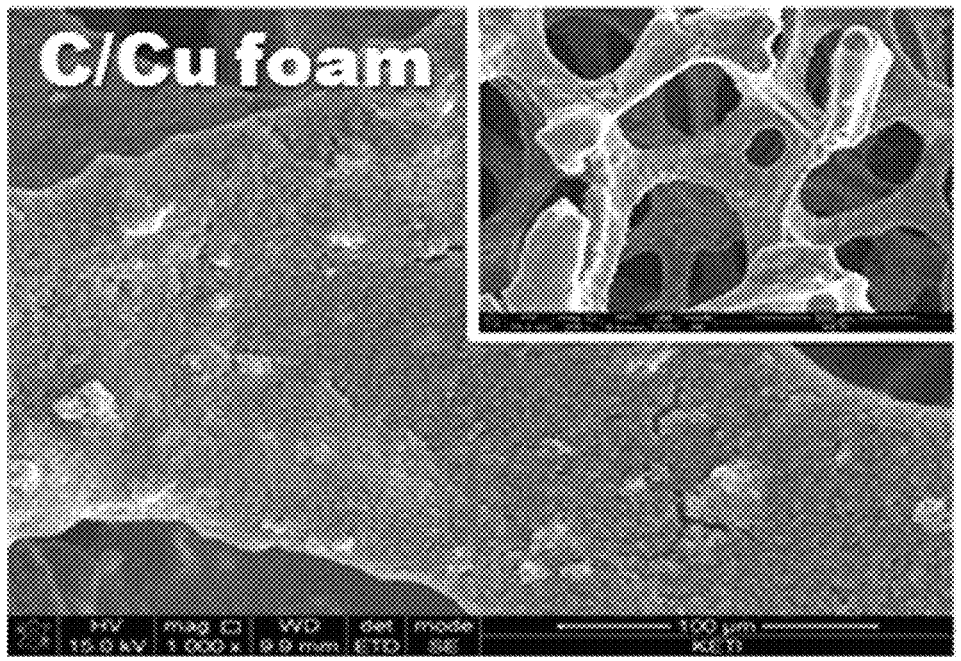

AFTER FILLING

SURFACE   CROSS SECTION

REDOX FLOW BATTERY

CROSS-REFERENCE TO RELATED APPLICATION

This application claims priority to Korean Patent Application No. 10-2013-0143246, filed on Nov. 22, 2013, in the Korean Intellectual Property Office, and all the benefits accruing therefrom under 35 U.S.C. § 119, the content of which is incorporated herein in its entirety by reference.

BACKGROUND

1. Field

The present disclosure relates a redox flow battery. More specifically, the present disclosure relates to a redox flow battery having a low internal resistance and improved energy efficiency.

2. Description of the Related Art

A redox flow battery is similar to other secondary batteries in that it converts electrical energy, which is put into the battery through a charging process, to chemical energy, stores the chemical energy, and converts the stored chemical energy to electrical energy in a discharging process to provide electrical energy. However, a redox flow battery is different from such a secondary battery in that a redox flow battery uses a tank for storage of an electrode active material since the electrode active material having energy is in a liquid form.

Specifically, in a redox flow battery, a catholyte and an anolyte play the role of an electrode active material. The catholyte and the anolyte are respectively stored in tanks as a solution including a redox transition metal which may change its oxidation state.

On the other hand, as in a fuel cell, a cell of the redox flow battery generating electrical energy has a cathode/ion exchange membrane/anode structure. A catholyte and an anolyte are provided from each tank by a pump, and contact a cathode and an anode, respectively. At each contact surface, transition metal ions included in each of the electrolyte solution are oxidized or reduced, thus generating electromotive force corresponding to the Gibbs free energy of the oxidization or the reduction.

In a redox flow battery, an ion exchange membrane does not participate in a reaction but performs the function of rapidly transferring ions, which are charge carriers, between a catholyte and an anolyte. Thus, the ion exchange membrane electrically isolates a cathode and an anode by preventing direct contact between the two electrodes, and inhibits crossover of electrolyte active ions, which are dissolved in the catholyte and the anolyte and which directly participate in a reaction.

In an available redox flow battery, each component is prepared from a material similar to the material of a fuel cell, thus keeping the battery cost high. A significant factor of the battery cost stems from use of Nafion®, which is a fluorinated ion exchange resin membrane, and an electrode which includes carbon felt and a carbon bipolar plate. Carbon felt, which is exclusively imported from other countries to Korea, can lack a surface treatment. On the other hand, a carbon bipolar plate is often cut, and the cutting process adds cost. Also, as a result, the thickness of a battery may not be minimized. A cation exchange membrane, such as Nafion®, has a low ion conductivity because a large size cation such as a quaternary ammonium cation ($N(CH_3CH_2)_4^+$) acts as a charge conductor and has a low charge/discharge efficiency (Coulomb efficiency) due to a severe crossover of ions. Therefore, the overall energy efficiency of the battery may be low.

Thus, there remains a need in a more cost efficient redox flow battery having high energy capacity.

SUMMARY

Provided is a redox flow battery which may be prepared economically and has high energy efficiency.

An aspect provides a redox flow battery including: a cathode cell including a cathode, a catholyte, and a bipolar plate; an anode cell including an anode, an anolyte, and a bipolar plate; and an ion exchange membrane interposed between the cathode cell and the anode cell, wherein at least one of the cathode and the anode includes a carbon-coated metal foam, wherein the ion exchange membrane includes a porous substrate and a polymer disposed in pores of the porous substrate, wherein the polymer is a polymerization product of a composition for preparing an ion exchange membrane, wherein the composition for preparing an ion exchange membrane includes a first aromatic vinyl monomer including a halogenated alkyl group or a quaternary ammonium group, and wherein the bipolar plate includes at least one metal selected from Ni, Cu, Fe, Cr, Al, W, Ti, and an alloy thereof.

According to an embodiment, the composition for preparing an ion exchange membrane may further include a second aromatic vinyl monomer.

According to another embodiment, the composition for preparing an ion exchange membrane may further include a cross-linking agent.

According to another embodiment, the bipolar plate may include aluminum or stainless steel.

According to another embodiment, the carbon-coated metal foam electrode may be a product of spray deposition of a slurry including a carbon source, a binder, and a solvent on a metal foam.

BRIEF DESCRIPTION OF THE DRAWINGS

These and/or other aspects will become apparent and more readily appreciated from the following description of the embodiments, taken in conjunction with the accompanying drawings in which:

FIGS. 3E and 3F are the scanning electron microscope ("SEM") images of the metal foam electrodes prepared in Preparation Example 2-2, before the carbon coating;

FIGS. 3G and 3H are the scanning electron microscope ("SEM") images of the metal foam electrodes prepared in Preparation Example 3-2, respectively, after the carbon coating, before the carbon coating;

DETAILED DESCRIPTION

Figure 1:
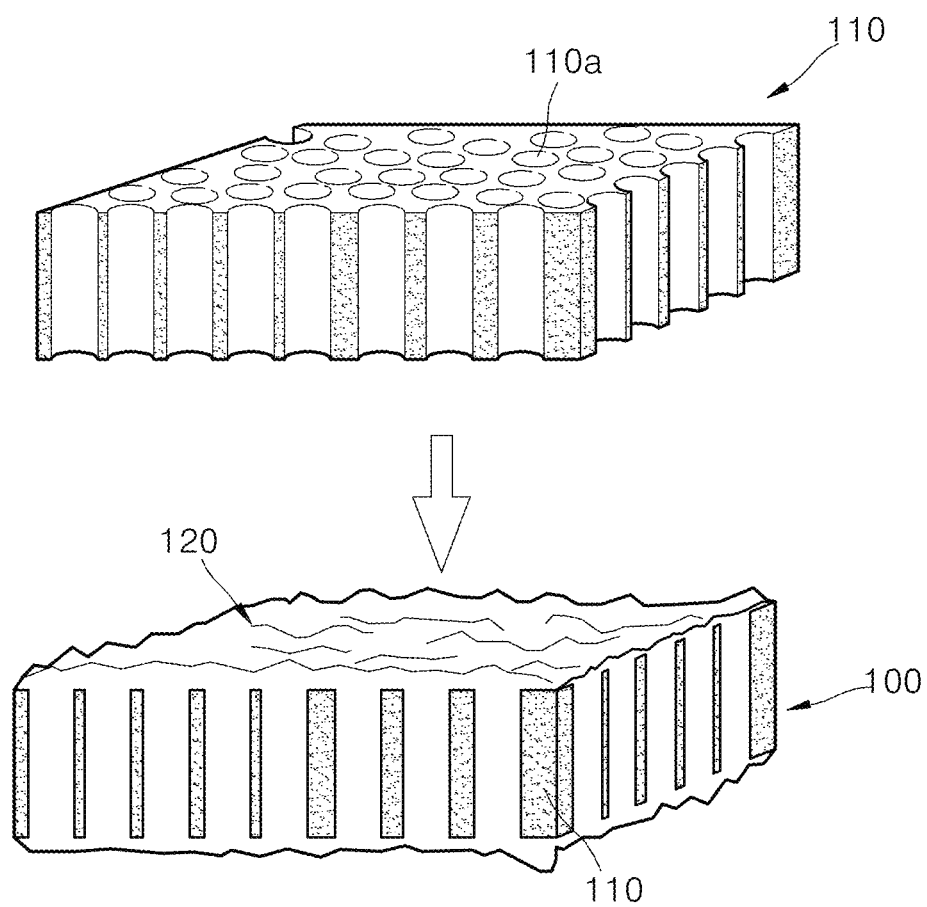
FIG. 1 is a diagram schematically showing an embodiment of a method of preparing an ion exchange membrane.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when a definition is not otherwise provided, the term "alkyl" indicates a group derived from a completely saturated, branched or unbranched (or a straight or linear) hydrocarbon and having a specified number of carbon atoms.

Hereinafter, a redox flow battery according to an embodiment is disclosed in further detail.

A redox flow battery according to an embodiment includes:

a cathode cell including a cathode, a catholyte, and a bipolar plate;

an anode cell including an anode, an anolyte, and a bipolar plate; and an ion exchange membrane interposed between the cathode cell and the anode cell, wherein at least one of the cathode and the anode includes a carbon-coated metal foam, wherein the ion exchange membrane comprises a porous substrate and a polymer disposed in pores of the porous substrate, wherein the polymer is a product of a composition for preparing an ion exchange membrane, and wherein the composition for preparing an ion exchange membrane includes a first aromatic vinyl monomer comprising a halogenated alkyl group or a quaternary ammonium group, and wherein the bipolar plate includes at least one selected from Ni, Cu, Fe, Cr, Al, W, Ti, and an alloy thereof.

As an electrode, redox flow batteries can employ a carbon electrode, for example, carbon felt, carbon fiber, or carbon paper. However, in the present disclosure, a metal foam having high electric conductivity and high durability is applied to improve the flow of an electrolyte solution, and carbon is coated on the metal foam to improve a specific surface area and electrochemical properties of the electrode. In addition, an ion exchange membrane, which is prepared by filling a porous substrate with a polymer prepared from a composition for preparing the ion exchange membrane, is used to increase the ion conductivity and thereby to reduce the internal resistance of a battery and to increase energy efficiency of a battery. Moreover, a carbon bipolar plate is substituted with a metal plate to reduce the entire weight of a battery and its durability, and avoid the thickness and mechanical processing, e.g., cutting of the carbon bipolar plate.

At least one of the cathode and the anode may include a carbon-coated metal foam. For example, both the cathode and the anode may include a carbon-coated metal foam. The carbon-coated metal foam electrode may have a carbon load in a range from about 0.1 weight percent (wt %) to about 5 wt %, based on a total weight of the carbon coated metal foam electrode. When the carbon load is in the above range, the reaction area of an active material may become wide to increase the battery efficiency.

A method of coating carbon on a metal foam to prepare the carbon-coated metal foam electrode is not particularly limited. For example, carbon may be coated on a metal foam by spray deposition of a slurry including a carbon source, a binder, and a solvent. The porosity of the metal foam may be in a range from about 75% to about 98%. When a battery has a metal foam having a porosity in this range, an electrolyte solution may readily flow. Any suitable metal which may be used as an electrode in a battery may be used in the metal foam. For example, at least one metal selected from aluminum, copper, titanium, nickel, chromium, and an alloy thereof may be used. The carbon may be at least one selected from carbon black, carbon fiber, carbon nanotube, and graphene. The binder may be, for example, at least one selected from polyvinylidene fluoride, polyamide, polyester, or polyvinyl benzene. The solvent may be, for example, N-methylpyrrolidone, dimethyl sulfoxide, and dimethylacetamide.

According to an embodiment, the bipolar plate may include stainless steel or an aluminum alloy.

According to an embodiment, the number of carbon atoms in a halogenated alkyl group of a first aromatic vinyl monomer included in the composition for preparing an ion exchange membrane may be from about 1 to about 10.

The number of carbon atoms in the halogenated alkyl group may be from about 1 to about 10, for example, from about 1 to about 5, or, for example, one. In addition, the halogenated alkyl group may include a halogen atom, such as Cl, F, Br and/or I.

The quaternary ammonium group may act as an anion exchanger.

The quaternary ammonium group may be obtained by aminating the halogenated alkyl group.

As the content of the first aromatic vinyl monomer in the composition for preparing an ion exchange membrane is increased, the ion exchange capacity ("IEC") of the finally produced ion exchange membrane is also increased. The term "ion exchange capacity" as used herein refers to the quantity of ions exchanged by an ion exchange membrane, which is measured by argentometric titration.

The first aromatic vinyl monomer may be at least one selected from vinyl benzyl chloride ("VBC"), (vinyl benzyl) trimethylammonium chloride, 1-allyl-3-methylimidazolium chloride, and O-allyl-N-benzylcinchonidinium chloride.

The composition for preparing an ion exchange membrane may further include a second aromatic vinyl monomer. The second aromatic vinyl monomer is used as a co-monomer and is different from the first aromatic vinyl monomer in that the second aromatic vinyl monomer does not have a halogenated alkyl group.

The second aromatic vinyl monomer may include at least one selected from styrene, benzyl methacrylate, phenyl methacrylate, and bisphenol A dimethacrylate.

According to another embodiment, the composition for preparing an ion exchange membrane may further include a cross-linking agent.

The cross-linking agent may include at least one selected from divinylbenzene ("DVB"), glutaldehyde, glycidyl methacrylate, diethylene glycol, and dimethacrylate.

The second aromatic vinyl monomer and the cross-linking agent improve the mechanical strength and the chemical stability of an ion exchange membrane.

The content of the second aromatic vinyl monomer may be about 1.0 moles or less per one mole of the first aromatic vinyl monomer. When the content of the second aromatic vinyl monomer is within the above range, an ion exchange membrane having a high ion conductivity may be obtained. For example, the content of the second aromatic vinyl monomer may be from about 0.1 to about 0.5 moles per one mole of the first aromatic vinyl monomer.

In addition, the content of the cross-linking agent may be about 0.5 moles or less per one mole of the sum of the first aromatic vinyl monomer and the second aromatic vinyl monomer. When the content of the cross-linking agent is within the range, an ion exchange membrane having an excellent mechanical property may be obtained. For example, the content of the cross-linking agent may be from about 0.1 to about 0.2 moles per one mole of the sum of the first aromatic vinyl monomer and the second aromatic vinyl monomer.

According to another embodiment, the porous substrate may be at least one selected from polyolefin, polytetrafluoroethylene, polyetheretherketone, polysulfone, polyimide, and polyamide-imide. The thickness of the ion exchange membrane may be from about 20 to about 100 micrometers (μm) and the IEC of the ion exchange membrane may be from about 2.0 milliequivalents per gram dry weight (meq/g-dry weight) to about 5.0 meq/g-dry weight.

The composition for preparing an ion exchange membrane may further include one or more solvents.

The solvent may be at least one selected from water, methanol, ethanol, dimethylacetamide, N-methyl-2-pyrrolidone, dimethylformamide, dimethyl sulfoxide, and tetrahydrofuran.

The content of the solvent in the composition for preparing an ion exchange membrane may be from about 0 to about 50 weight percent (wt %). When the content of the solvent is in the above range, during polymerization of the composition for preparing an ion exchange membrane, the drying time in a drying process may be reduced and a uniform membrane physical property may be obtained.

The composition for preparing an ion exchange membrane may further include a thermal polymerization initiator or a photopolymerization initiator.

The thermal polymerization initiator may be at least one selected from benzoyl peroxide, potassium persulfate, ammonium persulfate, sodium persulfate, ammonium bisulfate, sodium bisulfate, azobisisobutyronitrile, 1,1'-azobis(1-methylbutyronitrile-3-sodium sulfonate), and 4,4'-azobis(4-cyanovaleric acid).

The photopolymerization initiator may be at least one selected from 2,2-dimethoxy-2-phenylacetophenone, 2-oxoglutaric acid, 1-hydroxycyclohexyl)(phenyl)methanone, and 2-hydroxy-2-methylpropiophenone.

The content of the thermal polymerization initiator may be 0.01 mole or less per one mole of the sum of the first aromatic vinyl monomer, the second aromatic vinyl monomer, and the cross-linking agent. When the content of the thermal polymerization initiator is in the above range, a polymer having a uniform composition may be obtained and, accordingly, an ion exchange membrane having a uniform composition may be obtained. For example, the content of the thermal polymerization initiator may be from about 0.001 to about 0.008 moles per one mole of the sum of the first aromatic vinyl monomer, the second aromatic vinyl monomer, and the cross-linking agent.

The content of the photopolymerization initiator may be 0.01 moles or less per one mole of the sum of the first aromatic vinyl monomer, the second aromatic vinyl monomer, and the cross-linking agent. When the content of the photopolymerization initiator is in the range, a polymer having a uniform composition may be obtained and, accordingly, an ion exchange membrane having a uniform composition may be obtained. For example, the content of the photopolymerization initiator may be from about 0.001 to about 0.008 moles per one mole of the sum of the first aromatic vinyl monomer, the second aromatic vinyl monomer, and the cross-linking agent.

FIG. 1 is a diagram of an embodiment of a method of preparing an ion exchange membrane.

As shown in FIG. 1, the method of preparing an ion exchange membrane according to an embodiment includes impregnating the composition for preparing an ion exchange membrane 120 in a porous substrate having capability for ion exchange 110, and polymerizing the composition for preparing an ion exchange membrane 120 impregnated in the porous substrate 110.

The thickness of the porous substrate 110 may be 30 μm or less. When the thickness of the porous substrate is in the above range, the membrane resistance may be reduced.

The porous substrate 110 may be at least one compound selected from polyolefin, polytetrafuloroethylene, polyetheretherketone, polysulfone, polyimide, and polyamideimide. The porous substrate may have a pore 110a having a diameter of from about 0.01 μm to about 0.1 μm.

For example, when the composition for preparing an ion exchange membrane undergoes thermal polymerization, the polymerizing may be performed at a temperature from about 40° C. to about 80° C. for about two to about ten hours. In this case, during the polymerizing, a volatile material (e.g., an organic solvent) included in the composition for preparing an ion exchange membrane may be removed.

As another example, when the composition for preparing an ion exchange membrane undergoes photopolymerization, the polymerizing may be performed under ultraviolet radiation at room temperature (e.g., from about 20° C. to about 30° C.) for about 30 minutes to about one hour. In such a case, where the composition for preparing an ion exchange membrane undergoes photopolymerization, the method of preparing an ion exchange membrane may further include drying after the polymerizing. The drying may be performed at a temperature from about 40° C. to about 80° C. for about two to about ten hours. In this case, during the drying, a volatile material (e.g., an organic solvent) included in the composition for preparing an ion exchange membrane may be removed.

The method of preparing an ion exchange membrane may further include substituting a non-effective ion included in the first aromatic vinyl monomer or a polymerization product thereof with an effective ion. The term "effective ion" as used herein refers to an electrolyte component which penetrates an ion exchange membrane to enable a redox flow battery, which will be described later, to have a charge/discharge function. Examples of an effective ion include $BF_4^-$, $PF_6^-$, $CF_3SO_3^-$, or $(CF_3SO_2)_2N^-$. The term "non-effective ion" as used herein refers to an ion which is not an "effective ion" (e.g., a halogen ion such as $Cl^-$).

The substituting may be performed using a propylene carbonate ("PC")/triethylamine tetrafluoroborate ("TEABF$_4$") solution or PC/lithium bis(trifluoromethanesulfonyl)imide ("LiTFSI") solution.

The ion exchange membrane 100 prepared by the method has a greater number of ion channels, which are ion transport pathways, than the number of ions channels in the porous substrate 11. Therefore, the instant ion exchange membrane has the advantage that the penetration ratio of effective ions is high and the crossover of electrolyte components excluding the effective ions is low.

The ion exchange membrane may have an ion conductivity of about $1.0 \times 10^{-4}$ Siemens per centimeter (S/cm) or higher (e.g., from about $2.0 \times 10^{-4}$ to about $5.0 \times 10^{-4}$ S/cm).

The ion exchange membrane may have an ion exchange capacity ("IEC") from about 2 milliequivalents per gram-dry weight (meq/g-dry weight) to about 5 meq/g-dry weight. The abbreviation "meq" used herein refers to "milliequivalent" and the term "dry weight" used herein refers to the weight of a dried ion exchange membrane.

The ion exchange membrane may be used in an organic electrolyte solution.

With respect to the IEC, the drawback of aqueous ion exchange membranes is that these membranes are characterized by a very high swelling ratio. Thus, to prevent decrease of ion selectivity and membrane physical properties due to the high swelling ratio, the IEC of the aqueous ion exchange membrane is limited to a range from about 1.0 to about 2.0 meq/g-dry weight. However, since the swelling ratio is low when the non-aqueous ion exchange membrane is used in an organic electrolyte solution, the non-aqueous ion exchange membrane may have a high IEC as described above (i.e., higher than about 2.0 meq/g-dry weight and to about 5.0 meq/g-dry weight) as long as the ion selectivity is not decreased.

The ion exchange membrane may have a thickness of from about 20 μm to about 100 μm.

Hereinafter, referring to FIG. 2, an embodiment of a redox flow battery is described in further detail.

Figure 2:
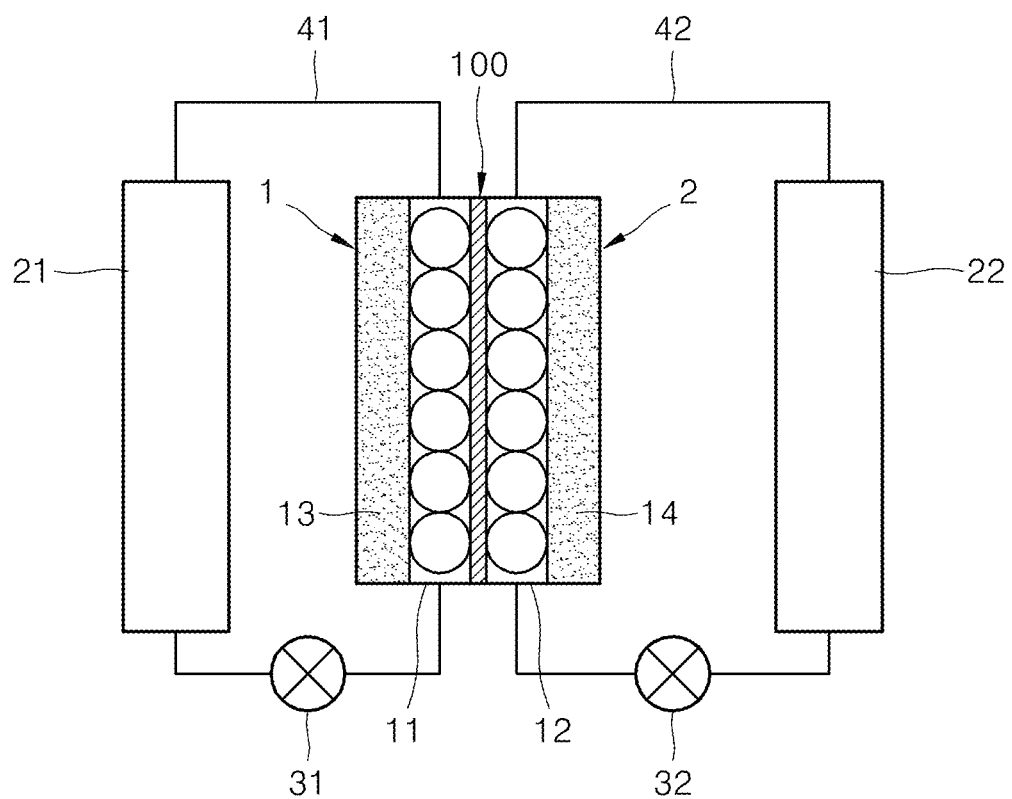
FIG. 2 is a schematic view of an embodiment of a redox flow battery.
Figure 3A:
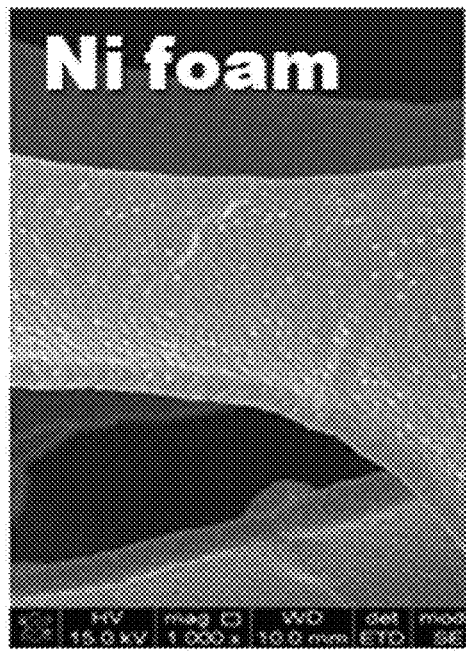
FIGS. 3A and 3B are the scanning electron microscope ("SEM") images of the metal foam electrodes prepared in Preparation Example 2-2, before the carbon coating.
Figure 3B:
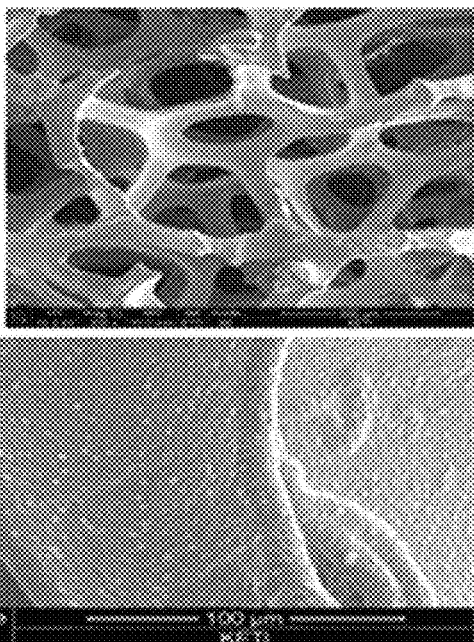
Figure 3C:
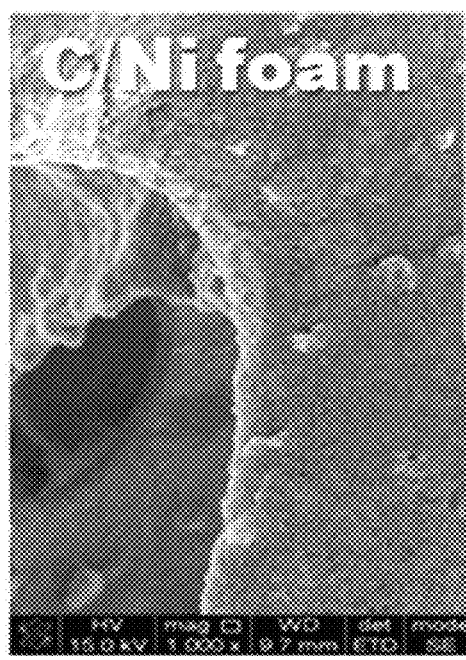
FIGS. 3C and 3D are the scanning electron microscope ("SEM") images of the metal foam electrodes prepared in Preparation Example 3-2, respectively, after the carbon coating, before the carbon coating.
Figure 3D:
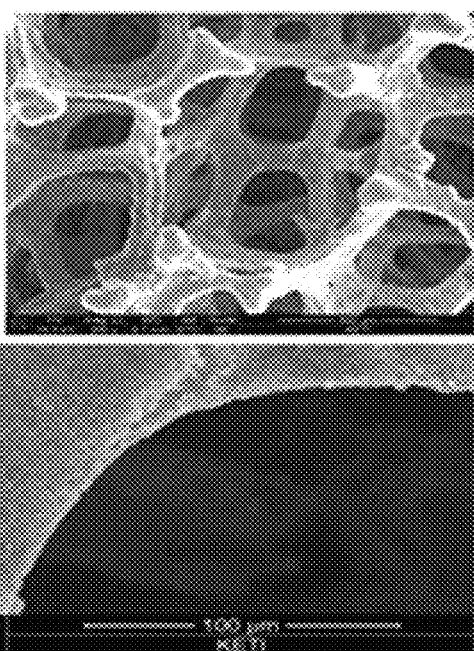
Figures 4A, 4B, 4C:
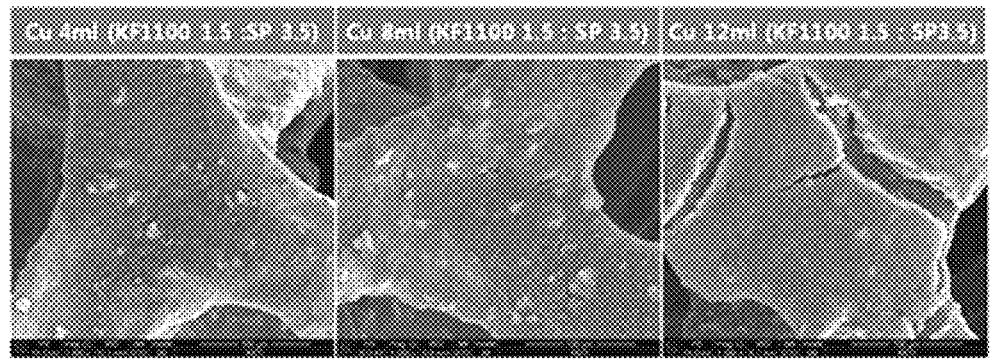
FIGS. 4A to 4C are the scanning electron microscope ("SEM") images of the carbon-coated metal foam electrodes prepared by varying the carbon load according to Preparation Example 2.
Figures 4D, 4E, 4F:
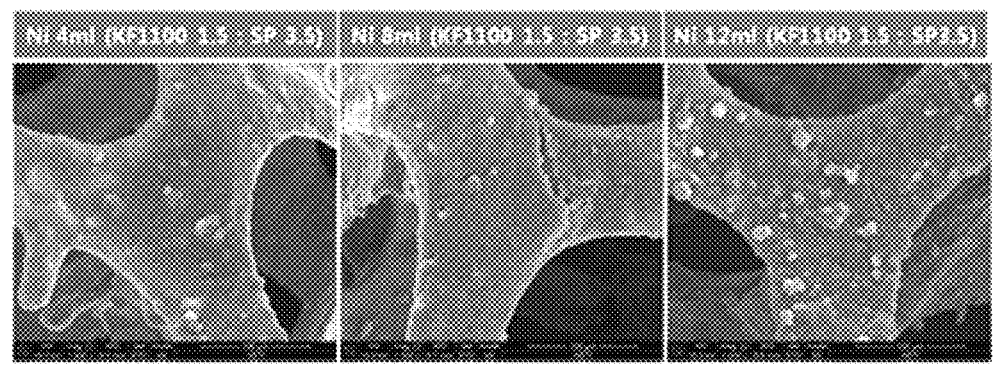
FIGS. 4D to 4F are the scanning electron microscope ("SEM") images of the carbon-coated metal foam electrodes prepared by varying the carbon load according to Preparation Example 3, respectively.

FIG. 2 is a schematic view of an embodiment of a redox flow battery.

As shown in FIG. 2, a redox flow battery according to an embodiment includes a cathode cell 1, an anode cell 2, an ion exchange membrane 100 isolating the cathode and anode cells, and catholyte and anolyte tanks 21 and 22, respectively, which are in fluid communication with the cathode and anode cells, respectively.

The cathode cell 1 includes a cathode 13 and a catholyte.

The anode cell 2 includes an anode 14 and an anolyte.

According to a redox reaction taking place in the cathode 13 and the anode 14, the battery is charged or discharged.

The cathode 13 and the anode 14 may respectively include a carbon-coated metal foam.

At least one of the catholyte and the anolyte may be an organic electrolyte solution.

The organic electrolyte solution may include a non-aqueous solvent, a supporting electrolyte, and a metal-ligand coordination compound.

The non-aqueous solvent may include at least one selected from dimetylacetamide, diethylcarbonate, dimethyl carbonate, acetonitrile, γ-butyrolactone ("GBL"), propylene carbonate ("PC"), ethylene carbonate ("EC"), N-methyl-2-pyrrolidone ("NMP"), fluoroethylene carbonate, and N,N-dimethylacetamide.

The supporting electrolyte does not directly participate in a reaction but plays the role of maintaining a charge balance between the catholyte and the anolyte. The supporting electrolyte may include at least one compound selected from $LiBF_4$, $LiPF_6$, $LiClO_4$, $LiCF_3SO_3$, $Li(CF_3SO_2)_2N$, triethylamine tetrafluoroborate ("TEABF$_4$"), 1-ethyl-2-methylpyrazolium tetrafluoroborate ("EMPBF$_4$"), spiro-(1,1')-bipyrrolidium tetrafluoroborate ("SBPBF$_4$"), piperidine-1-spiro-1'-pyrrolidinium tetrafluoroborate ("PSPBF$_4$"), tributylamine tetrafluoroborate ("TBABF$_4$"), and lithium bis(trifluoromethanesulfonyl)imide ("LiTFSI").

The metal in the metal-ligand coordination compound may be at least one selected from Fe, Ni, Co, Ru, Zn, Mn, Y, Zr, Ti, Cr, Mg, Ce, Cu, Pb, and V.

The ligand in the metal-ligand coordination compound may be at least one selected from dipyridyl, terpyridyl, ethylenediamine, propylenediamine, phenanthroline, and 2,6-bis(methylimidazole-2-ylidene)pyridine.

During a redox reaction, two or more electrons may be transported from the metal-ligand coordination compound.

The metal-ligand coordination compound may include at least one selected from the compounds represented by the chemical formulas:

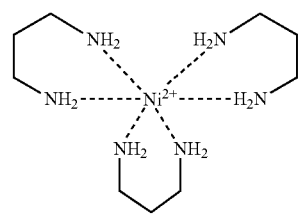

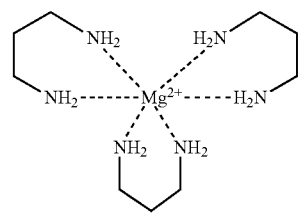

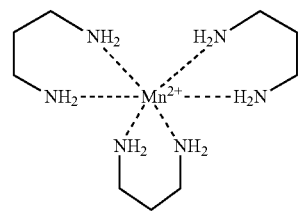

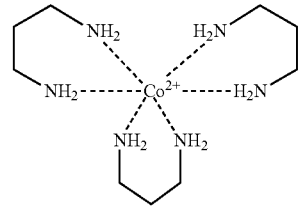

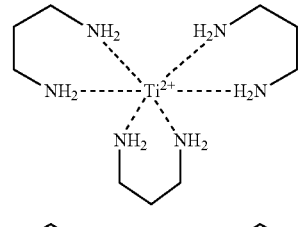

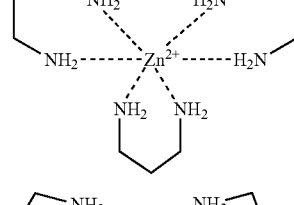

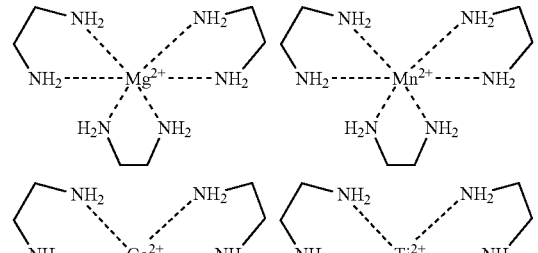

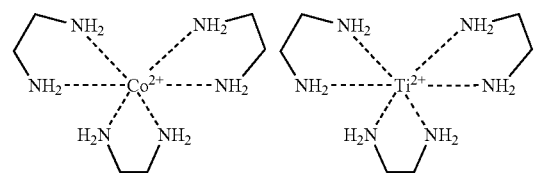

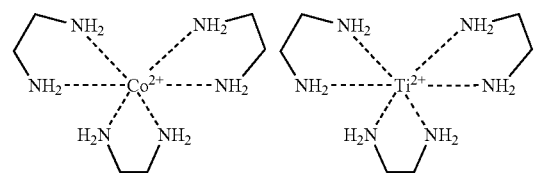

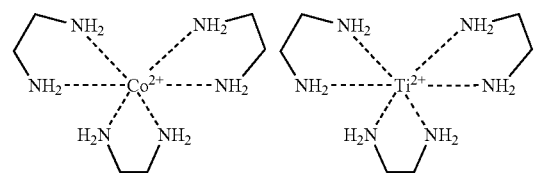

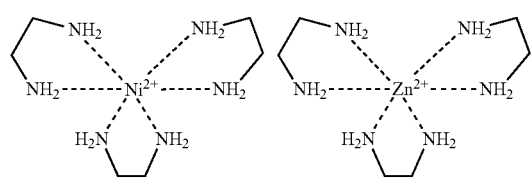
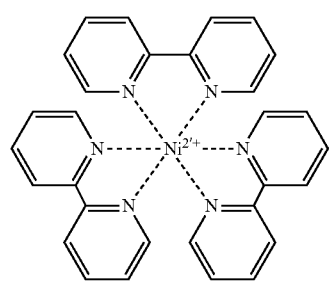
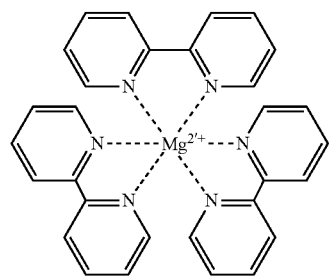
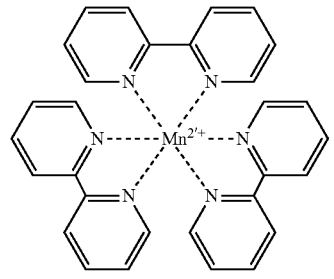
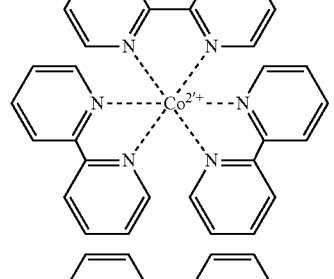
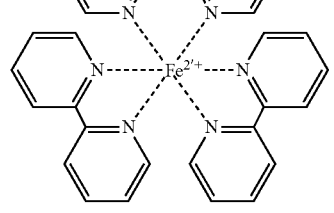
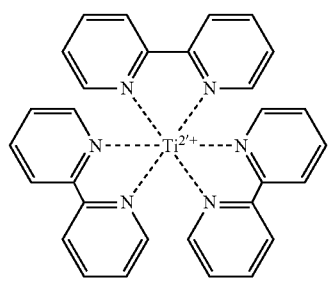
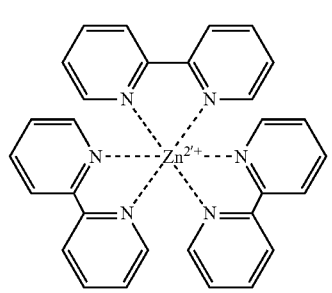
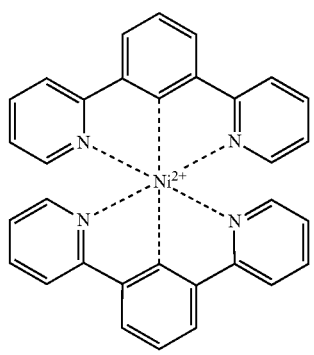
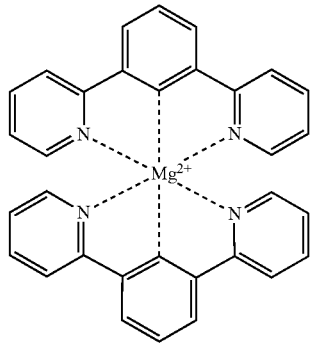
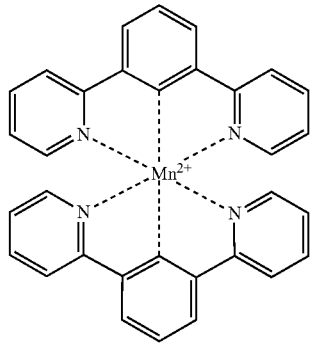

-continued
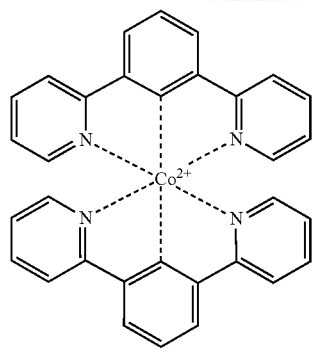
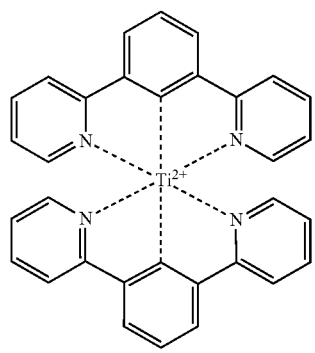
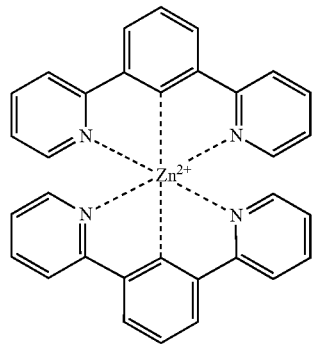
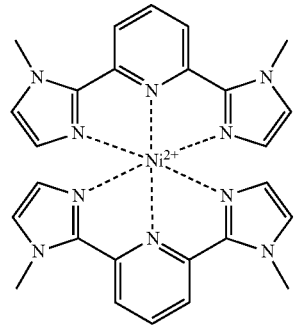
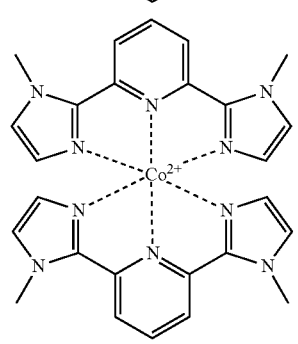
-continued
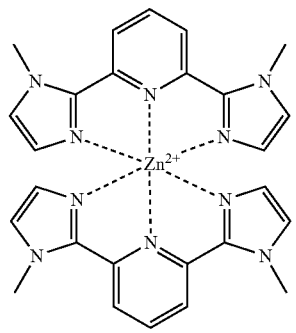
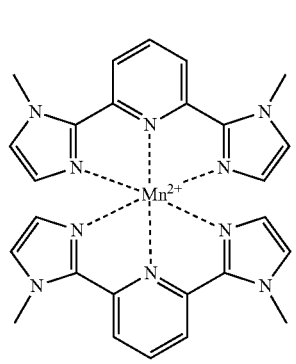
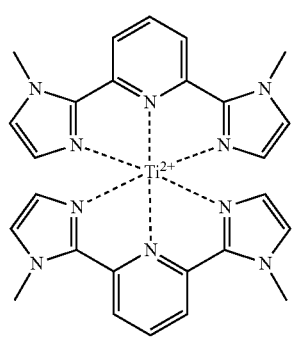
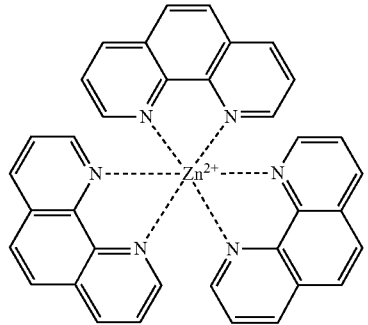
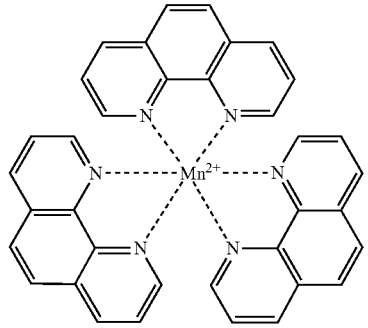

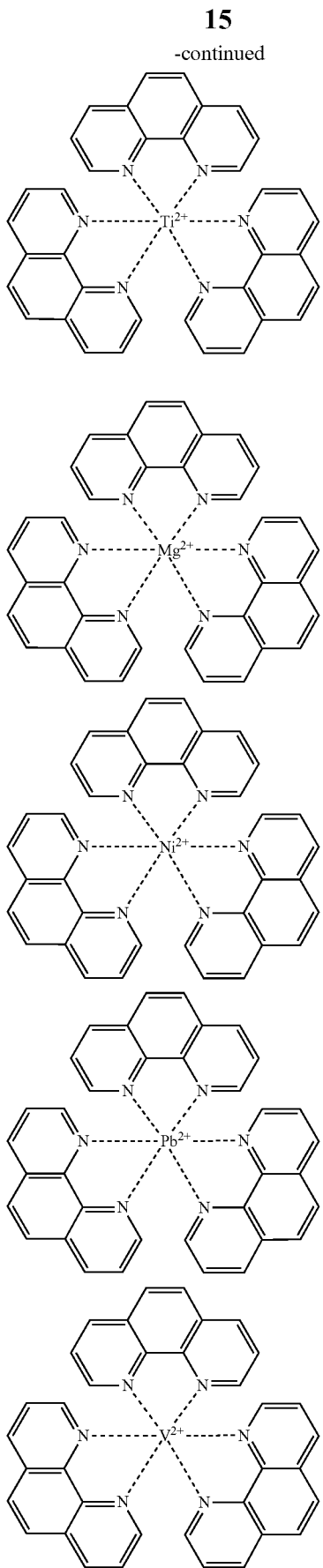

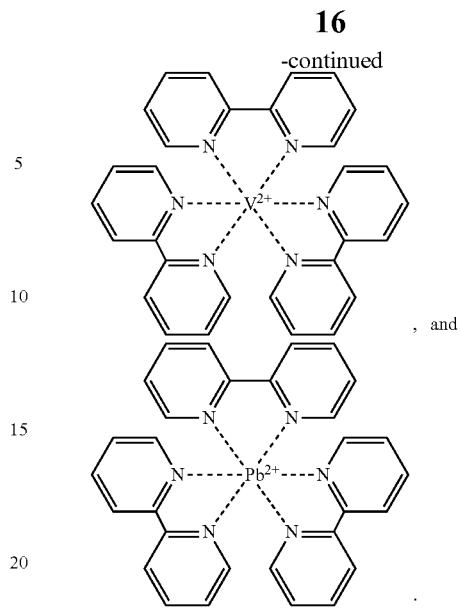

, and

The role of ion exchange membrane 100 is to allow penetration of the effective ion (i.e., the charge carrier ions of the supportive electrolyte) and to prevent penetration of the other electrolyte components included in the catholyte and the anolyte (i.e., components beside the effective ion).

The catholyte tank 21 stores the catholyte and is connected to, i.e., in fluid communication with, the cathode cell 1 through a tube 41. Similarly, the anolyte tank 22 stores the anolyte and is connected to the anode cell 2 through a tube 42.

The catholyte in catholyte tank 11 and the anolyte in anolyte tank 22 are circulated by pumps 31, 32, respectively.

The operational principle of the redox flow battery is disclosed in the Korean Patent Publication No. 10-2011-0088881, the content of which is incorporated herein in its entirety by reference.

The redox flow battery is suitable for mobile phones and mobile computers and is also suitable for a device using high capacity and high power output such as an electric vehicle. The redox flow battery may also be combined with an internal combustion engine, a fuel cell, and a super-capacitor for use in a hybrid vehicle. In addition, the redox flow battery may be used in all other devices using high power output and high voltage.

Hereinafter, the present concept will be described in further detail with reference to examples which will be described below. However, the present disclosure is not limited to the examples only.

Preparation Example 1: Preparation of Carbon-Coated Ni—FeCrAl Foam

Conductive carbon black (Super-P®) 70 wt % and polyvinylidene fluoride (PVdF) 30 wt % were mixed with NMP to prepare a slurry in which the solid content was 5%. Spray deposition of the slurry was performed on the surface of porous Ni—FeCrAl (porosity: 95%, Alantum Inc., 300 cm$^2$) to obtain a Ni—FeCrAl foam electrode wherein a surface of the Ni—FeCrAl foam electrode was coated with 8 milliliters (mL) of carbon black. The weight percentage of carbon black in the carbon-coated Ni—FeCrAl foam electrode prepared in Preparation Example 1 was 0.5 wt %.

Preparation Examples 2-1 to 2-3: Preparation of Carbon-Coated Cu Foam

A carbon-coated Cu foam was prepared by the same method as described in Preparation Example 1, except that Cu (porosity: 95%, Alantum Inc., 300 cm$^2$) was used instead of the porous Ni—FeCrAl and the volume of the embedded carbon black was 4 mL, 8 mL, and 12 mL (the volume of the slurry sprayed on 300 square centimeters (cm$^2$) of the electrode), respectively. The weight percentage of carbon black in the carbon-coated Cu foam prepared in Preparation Example 2-1 was 0.25 wt %. The weight percentage of carbon black in the carbon-coated Cu foam prepared in Preparation Example 2-2 was 0.50 wt %. The weight percentage of carbon black in the carbon-coated Cu foam prepared in Preparation Example 2-3 was 0.75 wt %.

Preparation Examples 3-1 to 3-3: Preparation of Carbon-Coated Ni Foam

A carbon-coated Ni foam was prepared by the same method as described in Preparation Example 1, except that Ni (porosity: 95%, Alantum Inc., 300 cm$^2$) was used instead of the porous Ni—FeCrAl and the volume of the embedded carbon black was 4 mL, 8 mL, and 12 mL (the volume of the slurry sprayed on 300 cm$^2$ of the electrode), respectively. The weight percentage of carbon black in the carbon-coated Ni foam prepared in Preparation Example 3-1 was 0.20 wt %. The weight percentage of carbon black in the carbon-coated Ni foam prepared in Preparation Example 3-2 was 0.40 wt %. Weight percentage of carbon black in the carbon-coated Ni foam prepared in Preparation Example 3-3 was 0.60 wt %.

Preparation Example 4: Preparation of Ion Exchange Membrane Using SK 23 μm as Porous Substrate Selection and Pretreatment of Porous Substrate A porous substrate (SK 23 μm)(SK20® polyolefin substrate) was impregnated in a 20 wt % sulfuric acid aqueous solution for 12 hours to wash the porous substrate. Then, the porous substrate was dried in a drying oven at 80° C. for three hours.

Preparation of Composition for Preparing Ion Exchange Membrane

Vinyl benzyl chloride ("VBC"), methyl methacrylate ("MMA"), styrene ("S"), and divinylbenzene ("DVB") were mixed at a molar ratio of 1:0.3:0.1:0.3 to prepare a composition for preparing an ion exchange membrane.

Preparation of Ion Exchange Membrane

The pre-treated porous substrate was impregnated in the composition for preparing an ion exchange membrane for from about three to about five hours for the composition for preparing an ion exchange membrane to absorb on the porous substrate. After pulling out the porous substrate on which the composition for preparing an ion exchange membrane was absorbed, the substrate was irradiated with light at room temperature by using a 1 kW UV lamp for about 15 minutes. Then, the substrate was washed by using PC to obtain an ion exchange membrane.

Preparation Example 5: Preparation of Ion Exchange Membrane Using Highpore 25 μm as Porous Substrate An ion exchange membrane was prepared by the same method as that of Preparation Example 4, except that Highpore 25 μm (Asahi Kasei®, polyolefin substrate) was used as a porous substrate.

Example 1

A redox flow battery was prepared by the following method.

The carbon-coated Ni—FeCrAl foam electrode prepared in Preparation Example 1 was used as a cathode, and the carbon-coated Cu foam electrode prepared in Preparation Example 2 was used as an anode.

As a bipolar plate, 2 millimeter (mm) thick Al 5052 was cut into a piece having the size of 280 cm×11 cm was used.

As an ion exchange membrane, the ion exchange membrane prepared in Preparation Example 4 was used.

A solution prepared by dissolving 0.2 molar (M) Fe(2,2'-bipyridine)$_3$(BF$_4$)$_2$ and 0.5 M SBPBF$_4$ salts in PC solvent was used as a catholyte solution, and a solution prepared by dissolving 0.1 M Ni(2,2'-bipyridine)$_3$BF$_4$ and 0.5 M spiro-(1,1')-bipyrrolidium tetrafluoroborate ("SB-PBF$_4$") salts in PC solvent was used as an anolyte solution.

Specifically, an insulator (Teflon film), a current collector (gold plate), and a bipolar plate were laminated on an end plate incorporated with nuts. The cathode was inserted to a concave of the bipolar plate to prepare a cathode cell. By the same method, the anode was used to prepare an anode cell. Subsequently, 3 mL of the catholyte solution prepared above was injected to the cathode cell to complete the cathode cell. In addition, 3 mL of the anolyte solution prepared above was injected to the anode cell to complete the anode cell. Then, the cathode cell and the anode cell were arranged to face each other, and the ion exchange membrane was interposed between the cathode cell and the anode cell. Afterward, four bolts, each having a Belleville spring, were inserted into the two cells and the bolts were fastened with a torque wrench to 1.5 Newton-meter (Nm) in a diagonal order to assemble the cells. After completing the assembly, each of the remaining electrolyte solutions was injected through the injection hole of each electrode and then the injection holes were blocked by using Teflon bolts to complete a redox flow battery.

Example 2

A redox flow battery was prepared by the same method as described in Example 1, except that the carbon-coated Ni foam prepared in Preparation Example 3 was used as a cathode instead of the carbon-coated Ni—FeCrAl foam.

Example 3

A redox flow battery was prepared by the same method as described in Example 1, except that the ion exchange membrane prepared in Preparation Example 5 was used as an ion exchange membrane.

Comparative Example 1

A redox flow battery was prepared by the same method as described in Example 2, except that Nafion 115, which is a cation exchange membrane, was used as an ion exchange membrane.

Comparative Example 2

A redox flow battery was prepared by the same method as described in Example 1, except that carbon felt (Sigracell® purchased from SGL Group) was used as a cathode and an anode.

Comparative Example 3

A redox flow battery was prepared by the same method as described in Example 1, except that a graphite plate (GEFC-GCP® purchased from GEFC) was used as a bipolar plate.

EVALUATION EXAMPLES

Evaluation Example 1: Evaluation of Carbon-Coated Metal Foam Electrode

The carbon-coated Cu foam electrode and the carbon-coated Ni foam electrode prepared in Preparation Example 2 and Preparation Example 3 were evaluated with respect to specific surface area, electrochemical reactivity, and electrochemical life cycle.

FIGS. 3A to 3H are the scanning electron microscope ("SEM") images of the Cu foam electrode and the Ni foam electrode prepared in Preparation Example 2-2 and Preparation Example 3-2, respectively, before and after carbon coating. FIGS. 3A to 3H show the porous structure of the metal foams and uniform coating of carbon black on the metal foam surface. The small images in FIGS. 3A to 3H are the SEM images of the entire Cu foam electrode and the Ni foam electrode prepared in Preparation Example 2-2 and Preparation Example 3-2, respectively, before and after carbon coating.

FIGS. 4A to 4F are the SEM images of the carbon-coated Cu foam electrode and the Ni foam electrode prepared by varying the carbon load according to Preparation Example 2 and Preparation Example 3, respectively.

Figure 5:
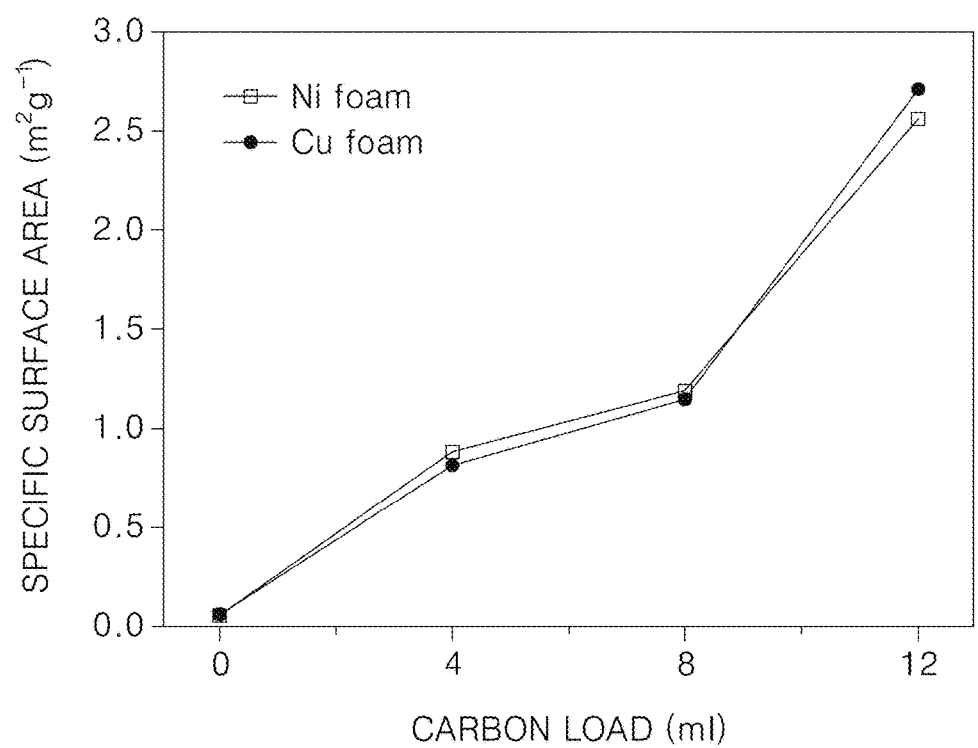
FIG. 5 is a graph of specific surface area (square meters per gram, $m^2/g$) versus carbon load (milliliters, ml) showing the specific surface area of the carbon-coated metal foam electrodes prepared by varying the carbon load according to Preparation Example 2 and Preparation Example 3.

FIG. 5 is a graph showing the specific surface area of the carbon-coated Cu foam electrode and the Ni foam electrode prepared by varying the carbon load according to Preparation Example 2 and Preparation Example 3. FIG. 5 shows that the specific surface area of the electrodes was increased as the carbon load was increased.

Figure 6A:
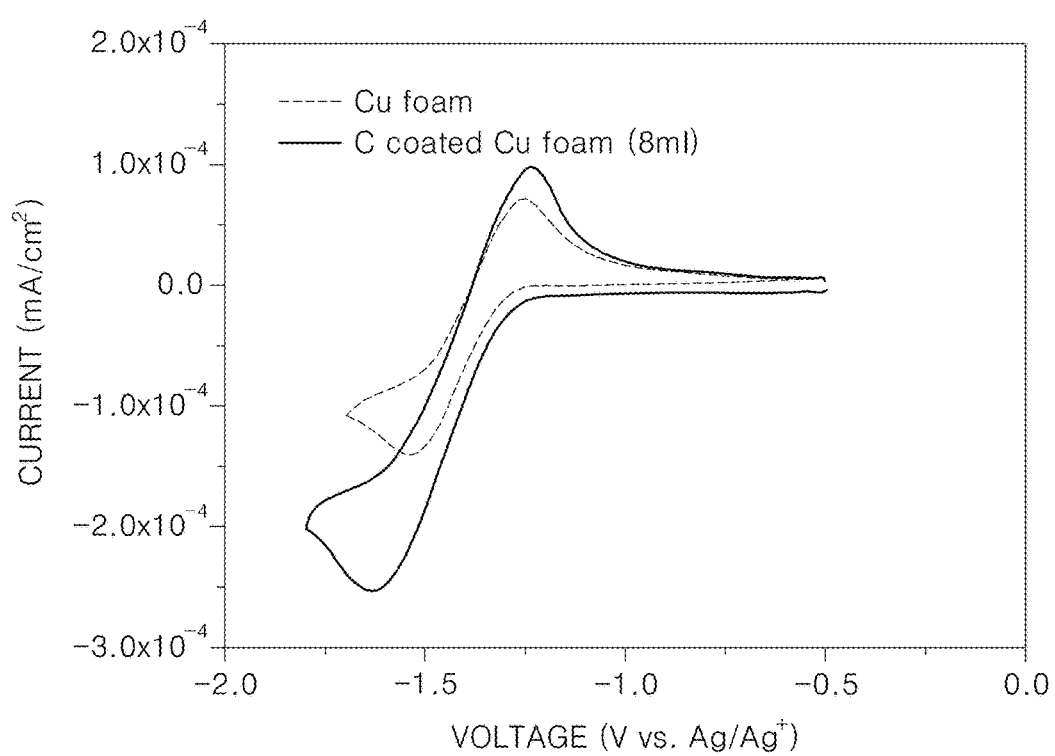
FIGS. 6A and 6B are graphs of current (milliamperes per square centimeter, $mA/cm^2$) versus voltage (volts vs. $Ag/Ag^+$) showing the cyclic voltammetry curves of the batteries including the carbon-coated metal foam electrodes prepared in Preparation Example 2-2 and Preparation Example 3-2.
Figure 6B:
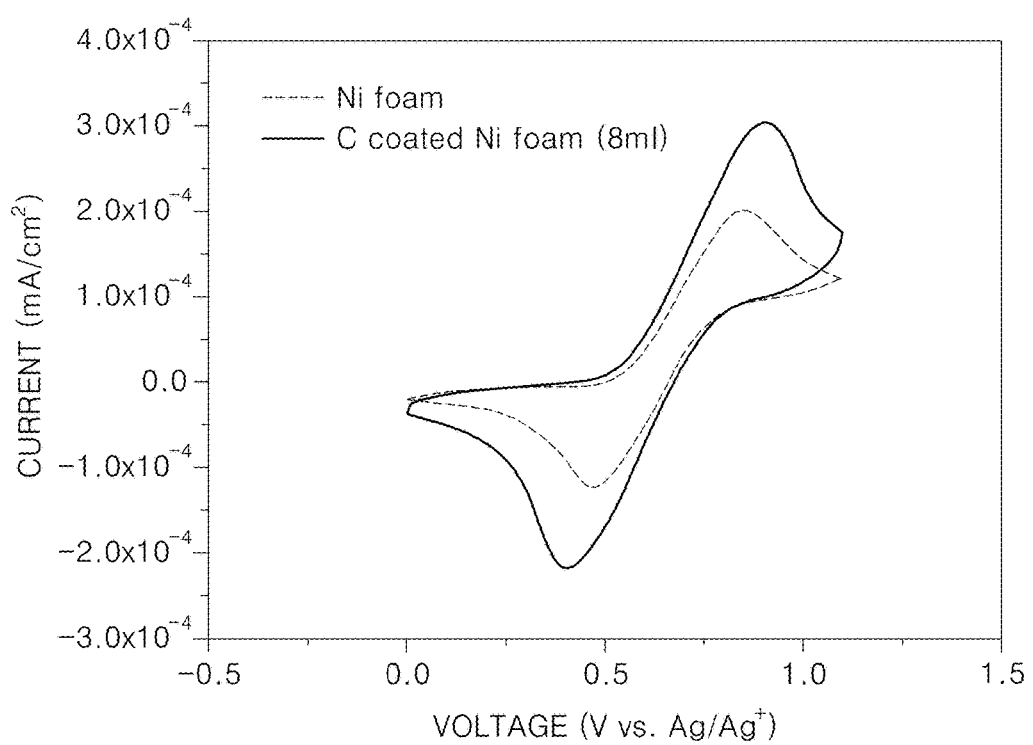

FIGS. 6A and 6B are graphs showing the cyclic voltammetry curves of the batteries including the carbon-coated Cu foam electrode and the Ni foam electrode prepared in Preparation Example 2-2 and Preparation Example 3-2. For comparison, the cyclic voltammetry curves of batteries including a Cu foam electrode and a Ni foam electrode having no coated carbon are also shown. As shown in FIGS. 6A and 6B, the electrochemical reactivity of the carbon-coated metal foam electrodes was better than that of the metal foam electrodes having no coated carbon.

The variation of the impedance of the batteries including the carbon-coated Cu foam electrode and the Ni foam electrode prepared in Preparation Example 2-2 and Preparation Example 3-2 after 1,000 charge/discharge cycles was measured by the method described below.

Figure 7A:
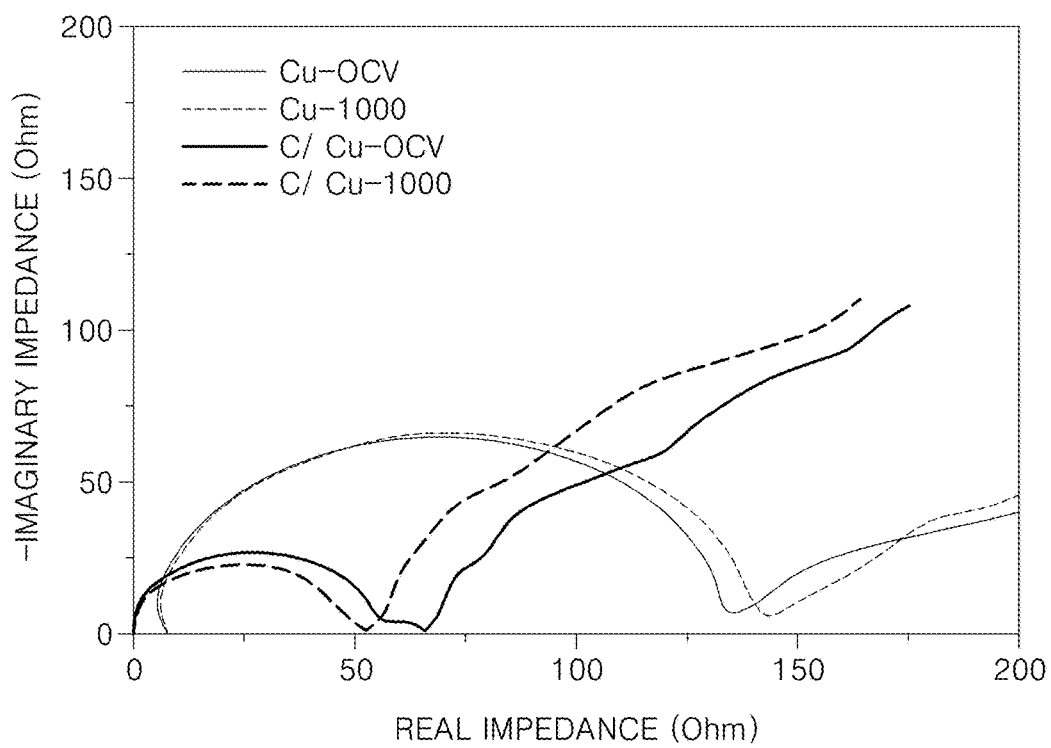
FIGS. 7A and 7B are graphs of imaginary impedance (Ohms) versus real impedance (Ohms) showing the variation of the impedance of the batteries including the carbon-coated metal foam electrodes prepared in Preparation Example 2-2 and Preparation Example 3-2 after 1,000 charge/discharge cycles.
Figure 7B:
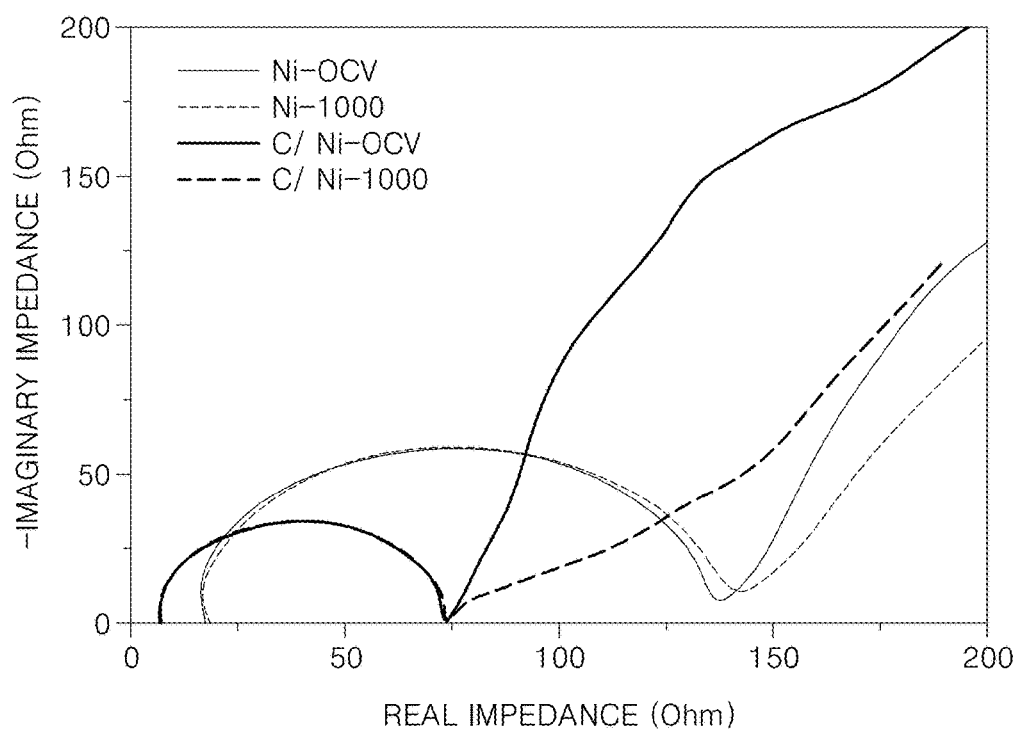

With respect to a redox couple ($Fe(bpy)_3(BF_4)_2$, $Co(bpy)_3(BF_4)_2$, and $Ni(bpy)_3(BF_4)_2$), a Nyquist plot of the electrodes prepared in Preparation Example 2-2 and Preparation Example 3-2 was obtained before a charge/discharge cycle and after 1,000 charge/discharge cycles, respectively. The obtained plots are shown in FIGS. 7A and 7B. An Rct value (a resistance value corresponding to the charge transport reaction at the electrode-electrolyte interface) was obtained from the plot. The obtained Rct values are shown in Tables 1 and 2 below.

FIGS. 7A and 7B are graphs showing the variation of the impedance of the batteries including the carbon-coated Cu foam electrode and the Ni foam electrode prepared in Preparation Example 2-2 and Preparation Example 3-2 after 1,000 charge/discharge cycles. For comparison, the variation of the impedance of batteries including a Cu foam electrode and a Ni foam electrode having no coated carbon are also shown. As shown in FIGS. 7A and 7B, there was little or almost no increase in the impedance after 1,000 charge/discharge cycles in the batteries including a carbon-coated metal foam electrode in comparison with the batteries including a metal foam electrode having no coated carbon.

TABLE 1

|   |   | $Rct(\Omega)$ |
|---|---|---|
| Cu | Before CV | 129.1 |
|   | After CV | 134.2 |
| C/Cu | Before CV | 54.30 |
|   | After CV | 46.50 |

As shown in Table 1 above, there was almost no increase in the resistance after 1,000 charge/discharge cycles in the case of the carbon-coated Cu foam.

TABLE 2

|   |   | $Rct(\Omega)$ |
|---|---|---|
| Ni | Before CV | 110.9 |
|   | After CV | 107.0 |
| C/Ni | Before CV | 66.44 |
|   | After CV | 67.96 |

As shown in Table 2 above, there was almost no increase in the resistance after 1,000 charge/discharge cycles in the case of the carbon-coated Ni foam.

Evaluation Example 2: Evaluation of Metal Bipolar Plate

With respect to the Al 5052 bipolar plate used in Example 1, the current depending on the applied voltage was measured by the following method. In a vessel including an electrolyte, a specimen of the bipolar plate was used as a working electrode and a carbon electrode was used as a counter electrode. Voltage was applied to these two electrodes in a certain range to measure the current to evaluate the stability of the bipolar plate against the electrolyte.

Figure 8A:
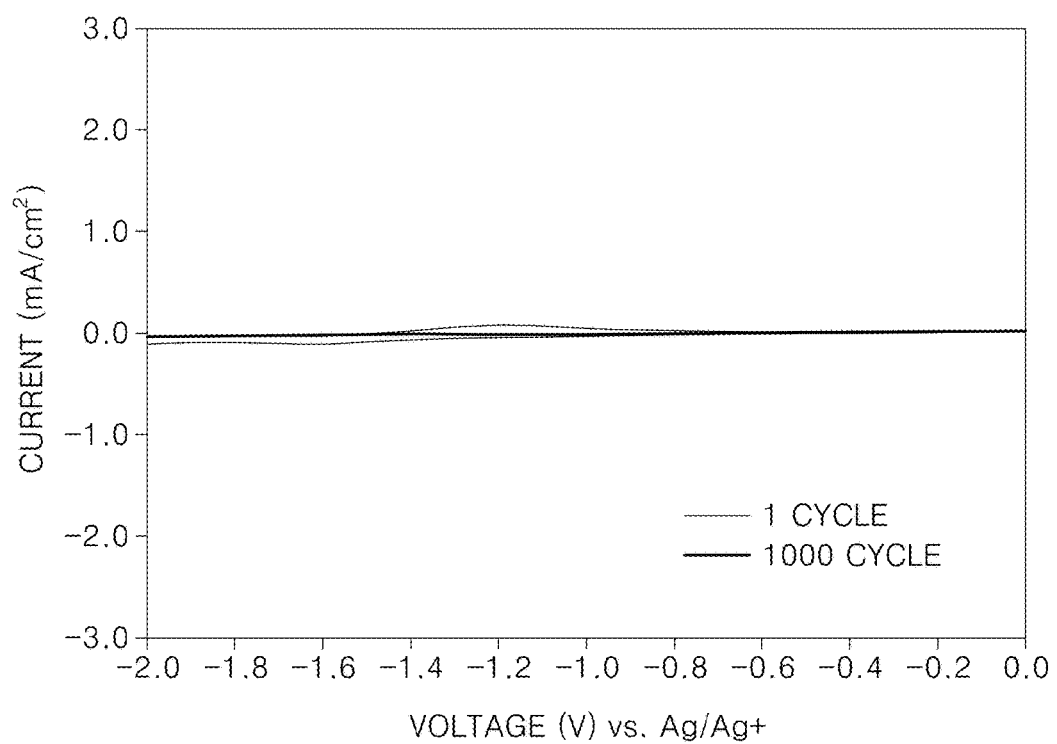
FIGS. 8A and 8B are graphs of current (milliamperes per square centimeter, $mA/cm^2$) versus voltage (volts vs. $Ag/Ag^+$) showing the variation of the current of the batteries including the bipolar plate used in Example 1 depending on the applied voltage.
Figure 8B:
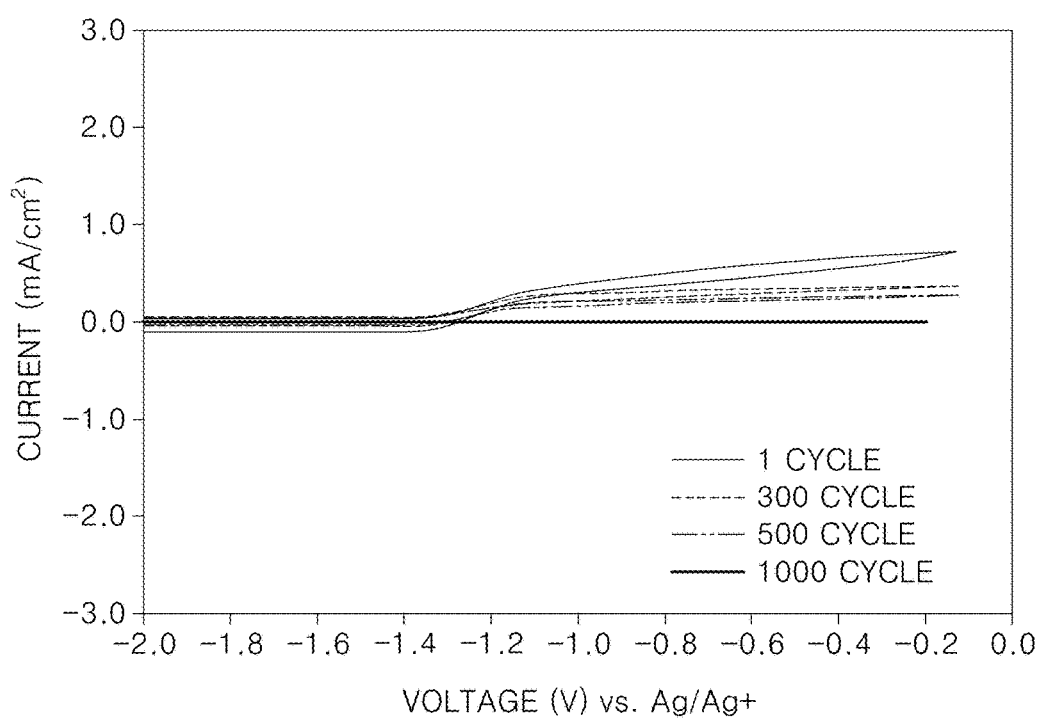

FIGS. 8A and 8B are graphs showing the current depending on the applied voltage which was measured with respect to the $Co(bpy)_3(BF_4)_2$ and $Ni(bpy)_3(BF_4)_2$, respectively.

With respect to the Al 5052 bipolar plate used in Example 1, the variation of the impedance after 1,000 charge/discharge cycles was measured.

With respect to a redox couple ($Co(bpy)_3(BF_4)_2$ and $Ni(bpy)_3(BF_4)_2$), a Nyquist plot of the Al 5052 bipolar plate used in Example 1 was obtained before a charge/discharge cycle and after 1,000 charge/discharge cycles, respectively. The obtained plots are shown in FIGS. 8A and 8B. An Rct value (a resistance value corresponding to the charge transport reaction at the electrode-electrolyte interface) was obtained from the plot. The obtained Rct values are shown in Tables 3 and 4.

Figure 9A:
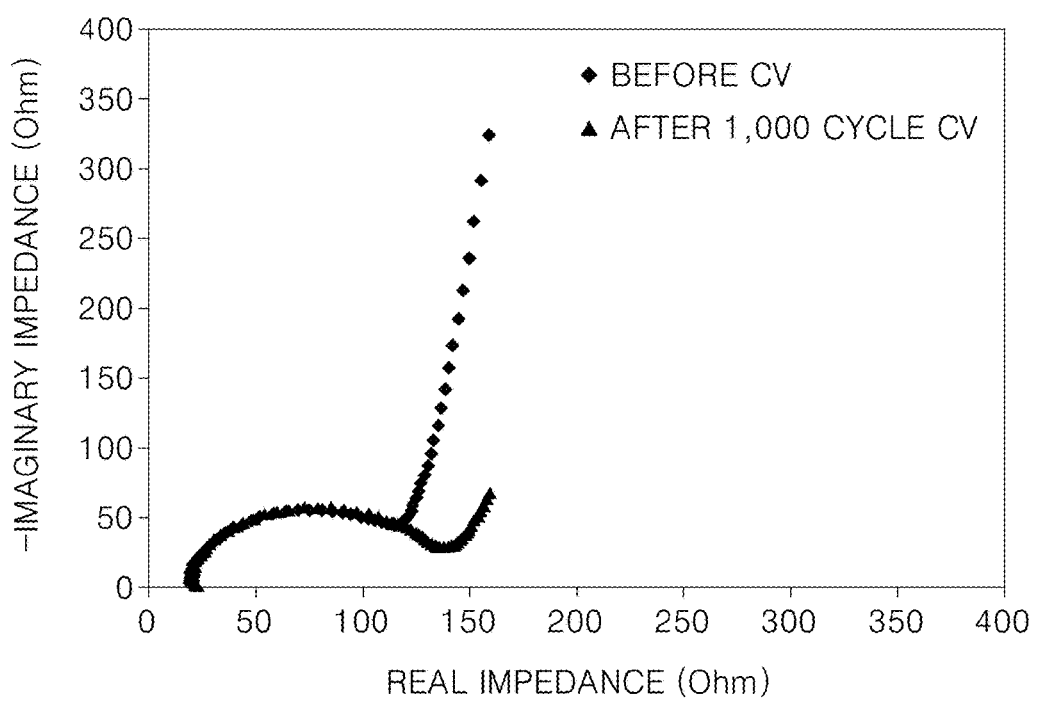
FIGS. 9A and 9B are graphs of imaginary impedance (Ohms) versus real impedance (Ohms) showing the variation of the impedance of the batteries including the bipolar plate used in Example 1 after 1,000 charge/discharge cycles.
Figure 9B:
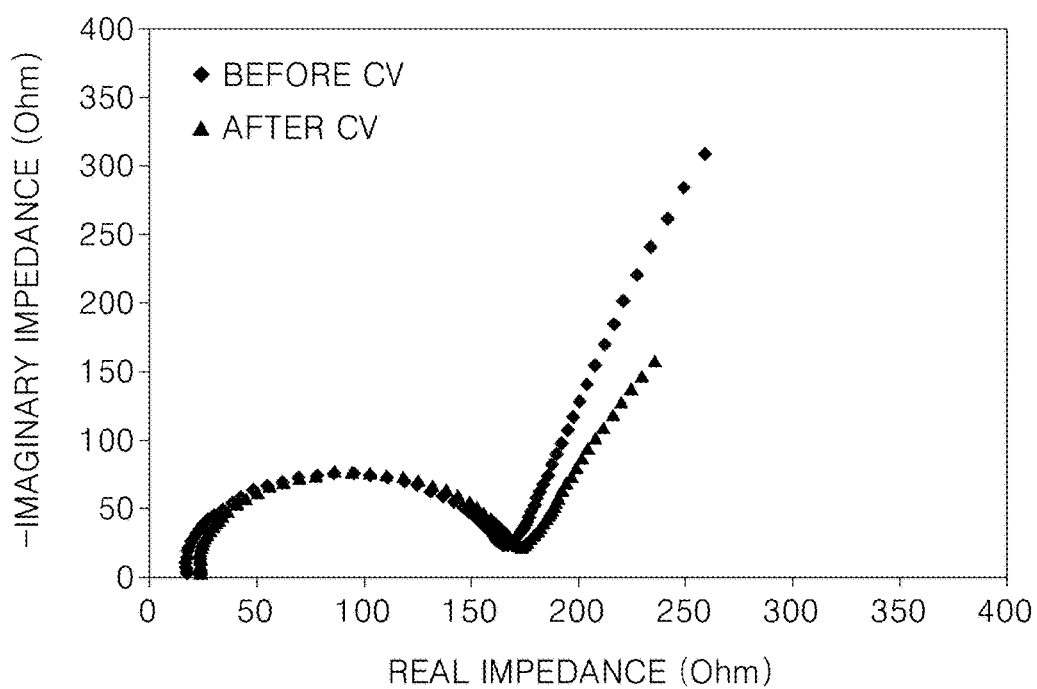

FIGS. 9A and 9B are graphs showing the variation of the impedance of the batteries after 1,000 charge/discharge cycles with respect to $Co(bpy)_3(BF_4)_2$ and $Ni(bpy)_3(BF_4)_2$, respectively.

TABLE 3

|  | Rs(Ω) | Rct(Ω) |
|---|---|---|
| Before CV | 19.09 | 107.4 |
| After CV | 19.48 | 116.7 |

The variation of the impedance of the batteries after 1,000 charge/discharge cycles was measured with respect to $Ni(bpy)_3(BF_4)_2$. The measurement result showed that the Rs (internal resistance) was increased by 2.1% and the Rct was increased by 8%.

TABLE 4

|  | Rs(Ω) | Rct(Ω) |
|---|---|---|
| Before CV | 20.25 | 153.0 |
| After CV | 14.43 | 152.3 |

The variation of the impedance of the batteries after 1,000 charge/discharge cycles was measured with respect to $Co(bpy)_3(BF_4)_2$. The measurement result showed that neither the Rs nor the Rct was increased.

Evaluation Example 3: Evaluation of Ion Exchange Membrane

Figure 10:
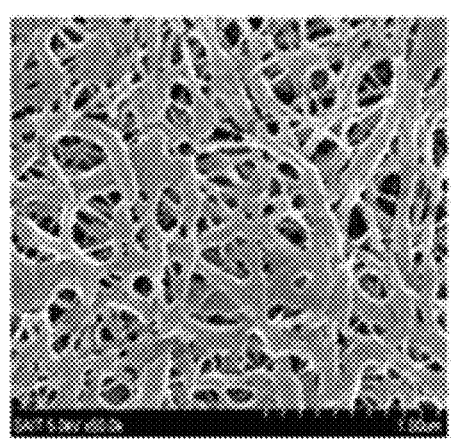
FIG. 10 shows the scanning electron microscope ("SEM") images of the cross-section and the surface of the ion exchange membrane prepared in Preparation Example 4.
Figure 10:
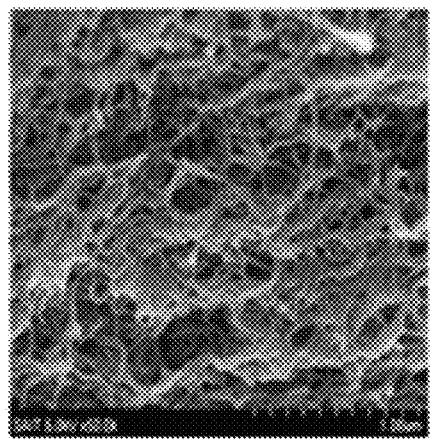
Figure 10:
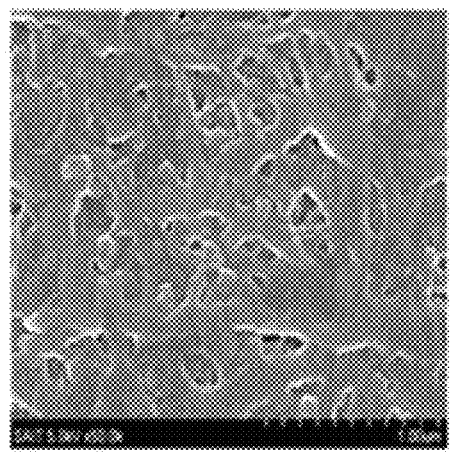
Figure 10:
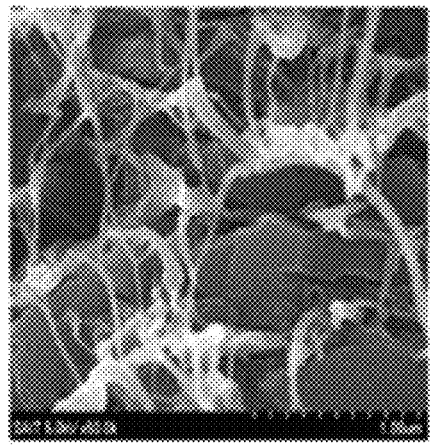
Figure 11A:
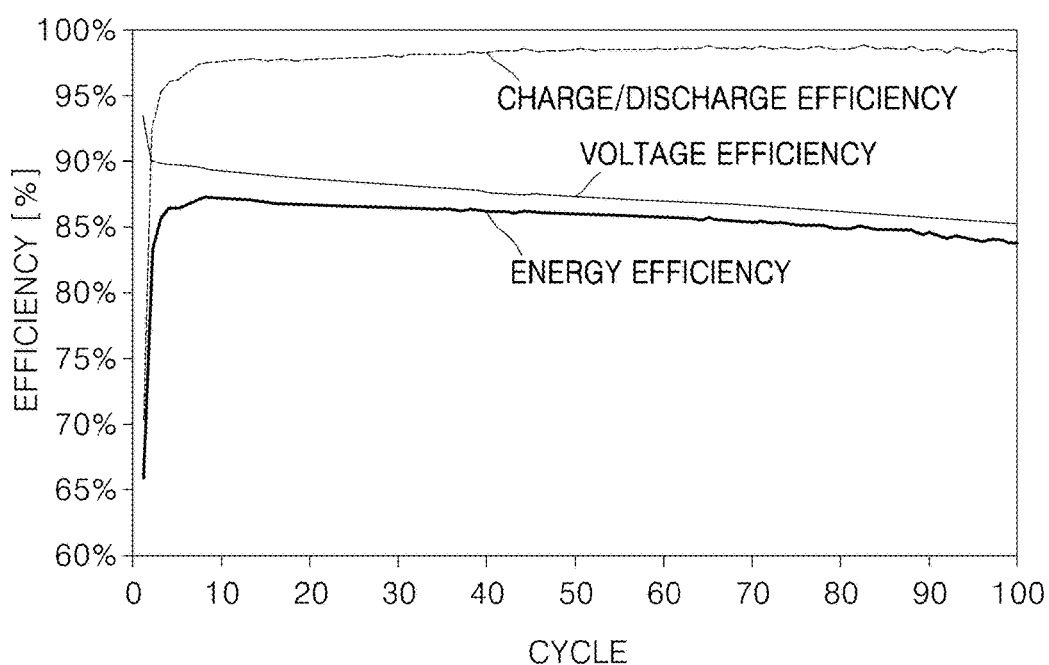
FIGS. 11A to 11F are graphs of efficiency (percent, %) versus cycle number showing the charge/discharge efficiency, voltage efficiency, and energy efficiency of the redox flow batteries prepared in Examples 1 to 3 and Comparative Examples 1 to 3.
Figure 11B:
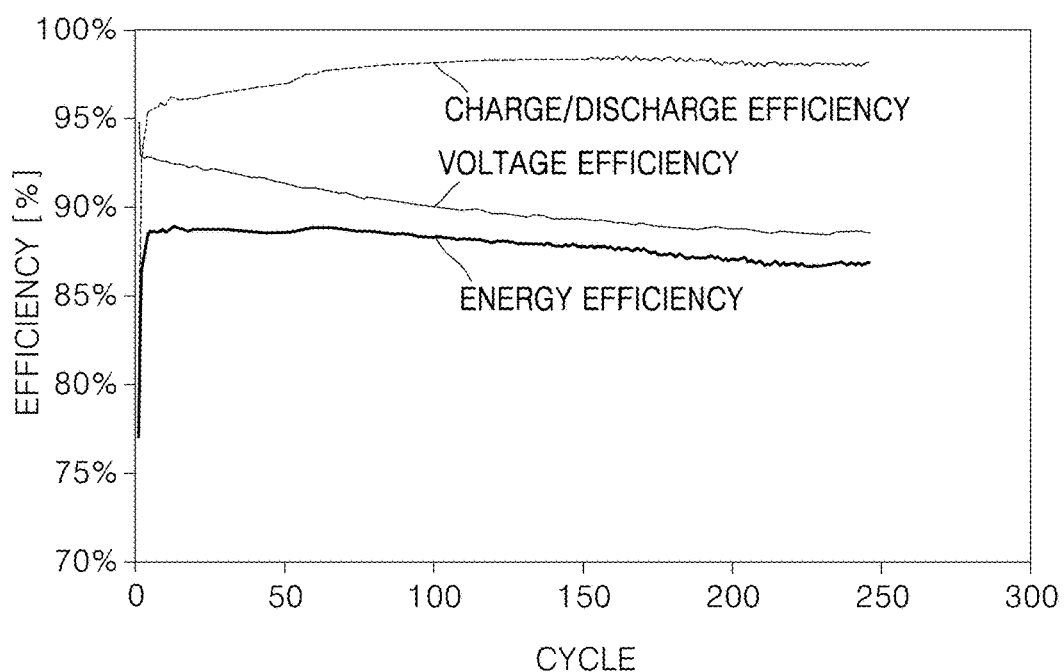
Figure 11C:
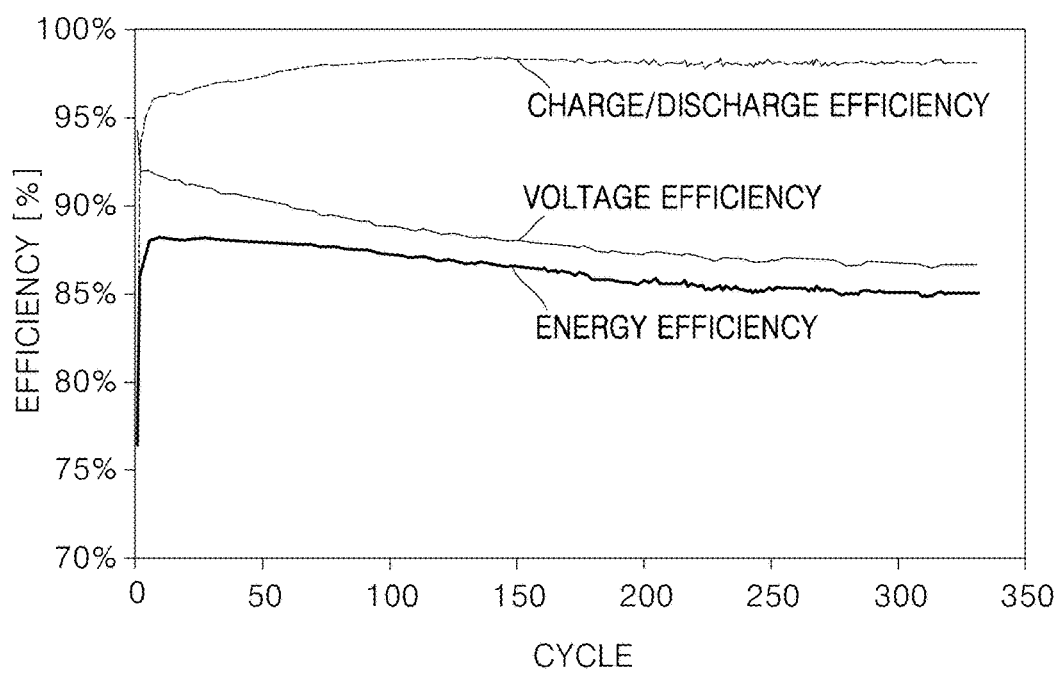
Figure 11D:
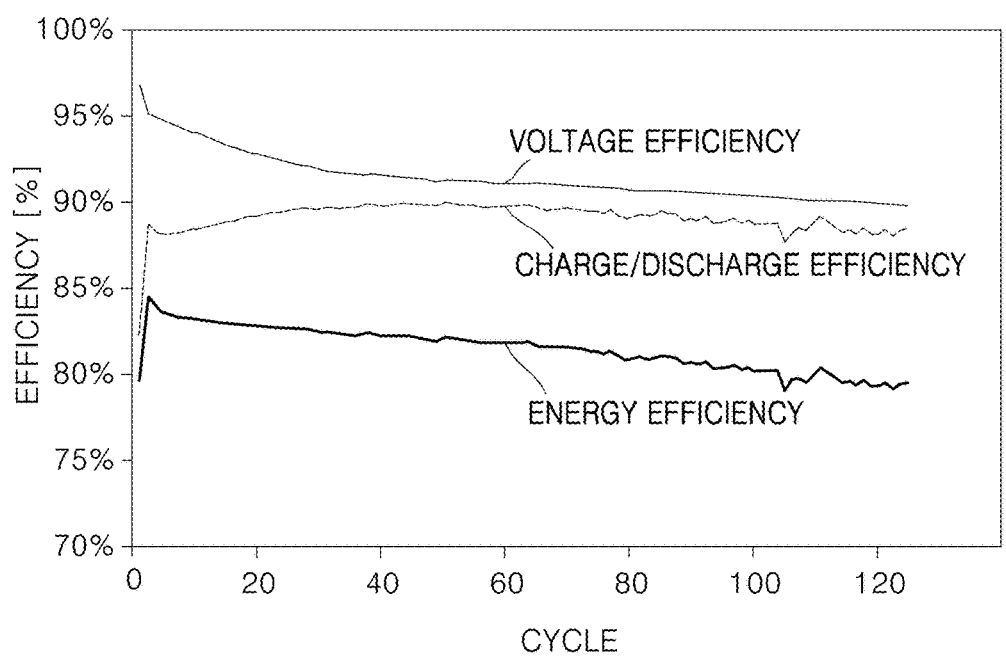
Figure 11E:
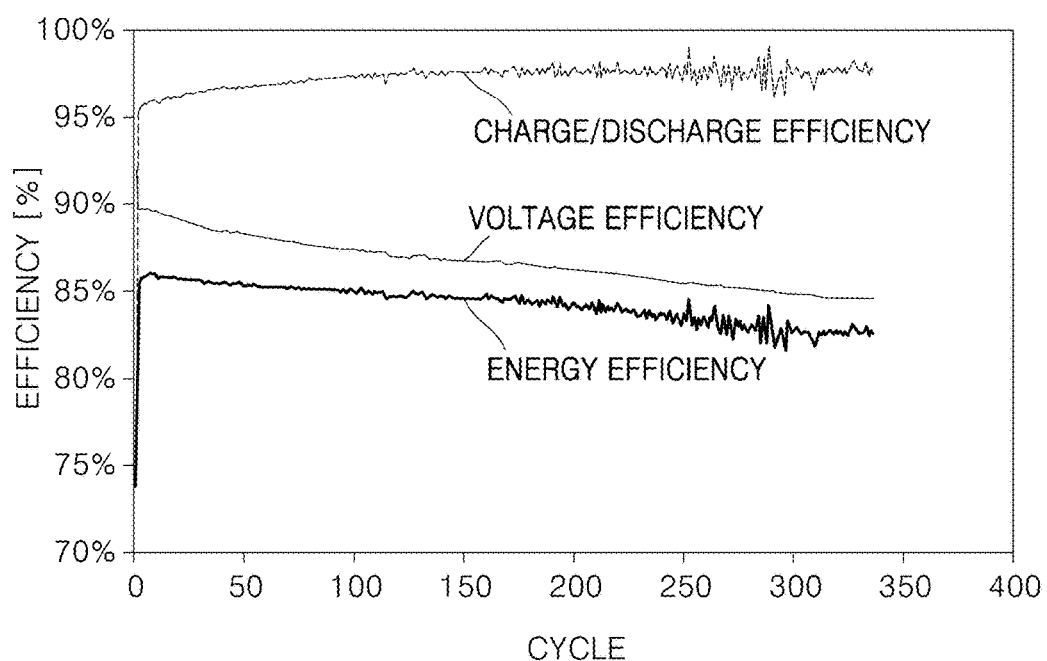
Figure 11F:
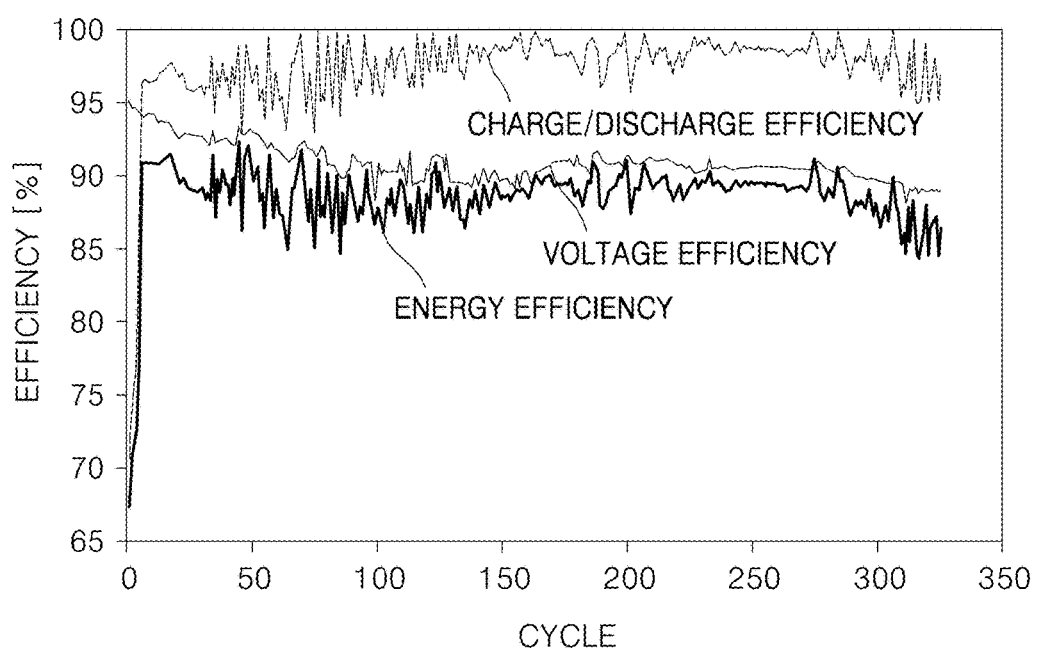

FIG. 10 shows the SEM images of the cross-section and the surface of the ion exchange membrane prepared in Preparation Example 4.

Since the composition for preparing an ion exchange membrane was filled in the porous substrate and then polymerized, the images of the cross-section and the surface of the ion exchange membrane show that the composition for preparing an ion exchange membrane completely filled in the pores of the ion exchange membrane substrate.

The ion exchange membrane prepared in Preparation Example 4 and Preparation Example 5 was impregnated in PC for 4 hours and 12 hours, respectively.

After the impregnation, the ion conductivity, ion exchange capacity ("IEC"), and Young's modulus of each ion exchange membrane were measured by the methods described below, and the results are shown in Table 5 below.

Water Swelling Ratio (WSR) Analysis

The dry weight ($W_{dry}$) of each ion exchange membrane prepared in Preparation Example 4 and Preparation Example 5 was measured and then the ion exchange membranes were impregnated in distilled water until equilibrium was reached. Then, the moisture on the membrane surface was removed and the wet weight ($W_{wet}$) was measured.

The WSR was measured according to Formula 1 below.

$$WSR(\%) = (W_{wet} - W_{dry})/W_{dry} \times 100 \quad \text{Formula 1}$$

Ion Conductivity

As an ion conductivity meter, Solartron 1260 Impedance Spectroscopy (Solartron Analytical) was used. The frequency range of the measurement was from about 0.1 Hertz (Hz) to about 1 MHz.

Ion Exchange Capacity ("IEC")

The IEC was measured by argentometric titration. The specific measurement method is described below.

(1) 100 mg of a sample is prepared (diluted with water, if necessary). The term "sample" used herein refers to each of the ion exchange membranes.

(2) When the chromaticity is high, 3 mL of $Al(OH)_3$ is added to the sample, and the resulting mixture is stirred. Then, the resulting precipitate is filtered.

(3) The pH of the sample is adjusted to from about 7 to about 8.

(4) 1 mL of $K_2CrO_4$ (a yellow indicator) is added to the sample.

(5) The sample is titrated by using $AgNO_3$.

(6) The titration point is a pinkish yellow end point.

Electrical Resistance

Firstly, an ion exchange membrane was impregnated in 0.5 M $TEABF_4$ solution until equilibrium is reached. Then, a clip cell connected to an impedance meter (Solartron 1260 Impedance Spectroscopy, Solartron Analytical, measurement frequency range: from about 0.1 Hz to about 1 MHz) was filled with the 0.5 M $TEABF_4$ solution to measure electric resistance (Rs). Afterward, the ion exchange membrane was inserted to the clip cell to measure the electric resistance (Rm). The value obtained by subtracting the measured Rs from the Rm was determined as the electric resistance of the ion exchange membrane.

TABLE 5

|  | Ion Conductivity ($10^{-2}$ S/cm) | IEC (meq/g-dry weight) | Electric Resistance (Ω·cm$^2$) |
|---|---|---|---|
| Preparation Example 4 | 6.38 | 1.20 | 60.25 |
| Preparation Example 5 | 5.20 | 1.56 | 13.35 |

As shown in Table 5, the ion exchange membranes according to Preparation Examples have high ion conductivity and low electric resistance even when the IEC exceeds 1.5 meq/g-dry weight.

Evaluation Example 4: Evaluation of Characteristics of Redox Flow Battery

A charge/discharge test was performed at room temperature (25° C.) with the redox flow batteries prepared in Examples 1 to 3 and Comparative Examples 1 to 3, and the results are shown in Table 6 and FIG. 11 below. FIGS. 11a to 11f correspond to Examples 1 to 3 and Comparative Examples 1 to 3, respectively.

The charge/discharge conditions are described below.

Each of the redox flow batteries was charged with constant current of 20 mA to 2.5 V and discharged with constant current of 20 mA to 2.0 V. By this method, the charge/discharge was repeated 17 times.

In Table 6 and FIG. 11 below, the charge/discharge efficiency refers to a percentage of the discharged electric charge quantity divided by the charged electric charge quantity, wherein the voltage efficiency refers to a percentage of the average discharged voltage divided by the average charged voltage, and the energy efficiency refers to a product of the voltage efficiency and the charge/discharge efficiency.

TABLE 6

|  | Charge/Discharge Efficiency (CE) (%) | Voltage Efficiency (VE) (%) | Energy Efficiency (EE)(%) |
|---|---|---|---|
| Example 1 | 97.7 | 88.8 | 86.7 |
| Example 2 | 97.7 | 90.0 | 87.9 |
| Example 3 | 97.9 | 88.2 | 86.4 |
| Comparative Example 1 | 89.2 | 91.2 | 81.5 |

TABLE 6-continued

| | Charge/Discharge Efficiency (CE) (%) | Voltage Efficiency (VE) (%) | Energy Efficiency (EE)(%) |
|---|---|---|---|
| Comparative Example 2 | 96.1 | 87.2 | 83.8 |
| Comparative Example 3 | 96.1 | 86 | 82.7 |

As shown in Table 6 above, the charge/discharge efficiency, voltage efficiency, and energy efficiency were all higher in the redox flow batteries prepared in Examples 1 to 3 than in the redox flow batteries prepared in Comparative Examples 2 and 3. However, the voltage efficiency of Comparative Example 1 was higher than that of Examples 1 to 3. A cation exchange membrane has higher ion conductivity than an anion exchange membrane and thus the voltage drop is small and the voltage efficiency is high. However, since a cation exchange membrane has larger pores and thus has more ion crossover, the charge/discharge efficiency of a cation exchange membrane is lower than that of an anion exchange membrane. Therefore, the overall energy efficiency of the disclosed anion exchange membrane is greater than that of the cation exchange membrane.

As described above, a redox flow battery according to an embodiment has low internal resistance and high energy efficiency and may be prepared economically.

Although embodiments have been described with reference to figures and examples above, it should be understood that numerous other modifications and embodiments can be devised from the present disclosure by those skilled in the art. Therefore, the present disclosure is defined only by the scope of the appended claims.

What is claimed is:

1. A redox flow battery comprising:
a cathode cell comprising a cathode, a catholyte, and a first bipolar plate;
an anode cell comprising an anode, an anolyte, and a second bipolar plate; and
an anion exchange membrane interposed between the cathode cell and the anode cell,
wherein at least one of the cathode and the anode comprises a carbon-coated metal foam,
wherein the catholyte and the anolyte are organic electrolyte solutions,
wherein the anion exchange membrane comprises, as separate components, a porous substrate and a polymer disposed in pores of the porous substrate, wherein the polymer is an anion exchange polymer and is a polymerization product of a composition for preparing the anion exchange membrane, wherein the composition for preparing the anion exchange membrane comprises a first aromatic vinyl monomer comprising a halogenated alkyl group or a quaternary ammonium group,
wherein the first bipolar plate and the second bipolar plate each independently comprise at least one metal selected from Ni, Cu, Fe, Cr, Al, W, Ti, and an alloy thereof, and
wherein the at least one of the cathode and the anode comprising the carbon-coated metal foam has a carbon load in a range from about 0.1 weight percent to about 5 weight percent, based on a total weight of the at least one of the cathode and the anode comprising a carbon-coated metal foam,
wherein the porosity of the metal foam is in a range from about 75 percent to about 98 percent, and
wherein an entire surface of the carbon-coated metal foam is uniformly coated with carbon.

2. The redox flow battery of claim 1, wherein the carbon-coated metal foam is a product of spray deposition of a slurry comprising a carbon, a binder, and a solvent on a metal foam.

3. The redox flow battery of claim 2, wherein the metal foam comprises a metal selected from Al, Cu, Ni, Cr, and an alloy thereof.

4. The redox flow battery of claim 2, wherein the carbon is at least one selected from carbon black, carbon fiber, carbon nanotube, and graphene.

5. The redox flow battery of claim 1, wherein the first bipolar plate and the second bipolar plate each independently comprise stainless steel or an aluminum alloy.

6. The redox flow battery of claim 1, wherein a number of carbon atoms in the halogenated alkyl group is from about 1 to about 10.

7. The redox flow battery of claim 1, wherein the first aromatic vinyl monomer comprises at least one selected from vinyl benzyl chloride, (vinyl benzyl)trimethylammonium chloride, 1-allyl-3-methylimidazolium chloride, and O-allyl-N-benzylcinchonidinium chloride.

8. The redox flow battery of claim 1, wherein:
the composition for preparing an anion exchange membrane further comprises a second aromatic vinyl monomer,
the second aromatic vinyl monomer comprises at least one selected from styrene, benzyl methacrylate, phenyl methacrylate, and bisphenol A dimethacrylate, and
a content of the second aromatic vinyl monomer is about 1 mole or less per one mole of the first aromatic vinyl monomer.

9. The redox flow battery of claim 1, wherein:
the composition for preparing an anion exchange membrane further comprises a second aromatic vinyl monomer,
the composition for preparing an anion exchange membrane further comprises a cross-linking agent, and
the cross-linking agent comprises at least one selected from divinylbenzene, glutaraldehyde, glycidyl methacrylate, diethylene glycol, and dimethacrylate.

10. The redox flow battery of claim 1, wherein:
the composition for preparing an anion exchange membrane further comprises a second aromatic vinyl monomer,
the composition for preparing an anion exchange membrane further comprises a cross-linking agent, and
a content of the cross-linking agent is about 0.5 mole or less, per one mole of a sum of moles of the first aromatic vinyl monomer and moles the second aromatic vinyl monomer.

11. The redox flow battery of claim 1, wherein the porous substrate comprises at least one selected from a polyolefin, polytetrafluoroethylene, polyetheretherketone, polysulfone, polyimide, and polyamide-imide.

12. The redox flow battery of claim 1, wherein a thickness of the anion exchange membrane is from about 20 micrometers to about 100 micrometers.

13. The redox flow battery of claim 1, wherein an ion exchange capacity of the anion exchange membrane is from about 2.0 milliequivalents per gram-dry weight to about 5.0 milliequivalent per gram-dry weight.

14. The redox flow battery of claim 1, wherein the first aromatic vinyl monomer comprises a halogenated alkyl group.

15. The redox flow battery of claim 1, wherein the first bipolar plate and the second bipolar plate each independently comprise Al.

16. The redox flow battery of claim 1, wherein the polymer consists of the polymerization product.

17. The redox flow battery of claim 1, wherein the at least one of the cathode and the anode comprising the carbon-coated metal foam has a carbon load in a range from about 0.2 weight percent to about 0.75 weight percent, based on a total weight of the at least one of the cathode and the anode comprising a carbon-coated metal foam.

18. The redox flow battery of claim 2, wherein the metal foam comprises Al, Ni, and Cr.

19. The redox flow battery of claim 2, wherein the metal foam comprises Cu.

20. The redox flow battery of claim 2, wherein the metal foam comprises Ni.

* * * * *